United States Patent
Browning et al.

(10) Patent No.: US 6,590,366 B1
(45) Date of Patent: Jul. 8, 2003

(54) CONTROL SYSTEM FOR ELECTROMECHANICAL ARRANGEMENTS HAVING OPEN-LOOP INSTABILITY

(75) Inventors: Douglas Roy Browning, Denville, NJ (US); Stephanie Novak, Murray Hill, NJ (US)

(73) Assignee: General Dyanmics Advanced Technology Systems, Inc., Greensboro, NC (US)

( * ) Notice: Subject to any disclaimer, the term of this patent is extended or adjusted under 35 U.S.C. 154(b) by 0 days.

(21) Appl. No.: 09/704,929

(22) Filed: Nov. 2, 2000

(51) Int. Cl.$^7$ .............................. H02K 7/09; H02P 9/40
(52) U.S. Cl. ........................... 322/49; 322/52; 310/90.5
(58) Field of Search ........................... 310/90.5, 90, 51; 384/121, 123, 107; 74/572; 396/55; 322/49, 52

(56) References Cited

U.S. PATENT DOCUMENTS

| | | | |
|---|---|---|---|
| 5,130,589 A | 7/1992 | Kanemitsu | 310/90.5 |
| 5,216,308 A | 6/1993 | Meeks | 310/90.5 |
| 5,287,031 A * | 2/1994 | Akiba et al. | 310/12 |
| 5,306,975 A | 4/1994 | Bichler | 310/90.5 |
| 5,347,190 A | 9/1994 | Lewis et al. | 310/90.5 |
| 5,355,042 A | 10/1994 | Lewis et al. | 310/90.5 |
| 5,486,729 A * | 1/1996 | Matsushita et al. | 310/90.5 |
| 5,543,673 A | 8/1996 | Katsumata et al. | 310/90.5 |
| 5,572,079 A | 11/1996 | Pinkerton | 310/90.5 |
| 5,720,010 A * | 2/1998 | Watanabe et al. | 318/568.18 |
| 5,736,800 A * | 4/1998 | Iannello et al. | 310/90.5 |
| 5,736,802 A * | 4/1998 | Ueyama et al. | 310/90 |
| 5,816,122 A * | 10/1998 | Benning et al. | 408/11 |
| 5,911,558 A * | 6/1999 | Nakazeki et al. | 415/118 |
| 5,925,957 A | 7/1999 | Chapman | 310/90.5 |
| 5,936,370 A * | 8/1999 | Fukao et al. | 318/138 |
| 5,986,373 A | 11/1999 | Stucker | 310/90.5 |
| 5,998,899 A * | 12/1999 | Rosen et al. | 310/112 |
| 6,005,315 A | 12/1999 | Chapman | 310/90.5 |
| 6,208,051 B1 * | 3/2001 | Ando | 310/90.5 |
| 6,215,218 B1 * | 4/2001 | Ueyama | 310/90.5 |
| 6,267,876 B1 * | 7/2001 | Allaire et al. | 218/114 |

* cited by examiner

*Primary Examiner*—Nestor Ramirez
*Assistant Examiner*—Julio Gonzalez Ramirez
(74) *Attorney, Agent, or Firm*—Moore & Van Allen, PLLC; Steven B. Phillips

(57) ABSTRACT

Control system for electromechanical arrangements having open-loop instability. The system is built around a control unit that processes sensing signals and provides control signals to maintain a movable member, such as a rotor or shaft, in the desired position. The control unit according to the invention includes a specially designed compensation filter, which isolates the open-loop instability so that the shaft is treated as a pure mass. In magnetic bearings, the open-loop instability is manifested as negative stiffness. The invention isolates the negative stiffness thus providing for better positive stiffness and improved bandwidth. Various filters, summers, and other operators required to carry out the invention are preferably implemented on a programmed processing platform such as a digital signal processor (DSP) or an arrangement of multiple digital signal processors. Algorithms involved can be implemented using background processing to obtain a compensation filter, which is then read into memory on the DSP and used to process the error signals at the DSP sampling rate. Alternatively, algorithms involved can be automated as part of a machine power up sequence and background monitoring can detect and adjust for changes in the magnetic bearing dynamics. The later option involves an on-line system id capability as well as highly sophisticated fitting algorithms that replace the decision-making capability of the operator.

1 Claim, 20 Drawing Sheets

CONTROL SYSTEM FOR ELECTROMECHANICAL ARRANGEMENTS HAVING OPEN-LOOP INSTABILITY

GOVERNMENT CONTRACT

The U.S. Government has a paid-up license in this invention and the right in limited circumstances to require the patent owner to license others on reasonable terms as provided for by the terms of contract No. N00024-91-C-4355 awarded by the United States Navy.

BACKGROUND

1. Field of the Invention

This invention is related to the field of electronic control systems. More particularly, this invention is related to a control system of the type based on microprocessors, for controlling electromechanical devices. It is particularly useful as a magnetic bearing control system for a magnetic bearing arrangement, such as the type used to levitate a rotating shaft.

2. Description of the Problem

The problem of lubrication and wear in moving mechanical parts is as old as the utilization of mechanical devices. Various schemes have been devised to eliminate or reduce either or both of these problems with varying degrees of success. One way of alleviating these problems in rotating machines is to use magnetic bearings. Magnetic bearings are well known. A magnetic bearing allows a movable member (a rotor) of a machine to rotate freely with very little friction. This lack of friction is achieved by suspending the movable member, usually a shaft, within a housing lined with magnetic devices, so that the shaft can rotate without touching any solid surfaces. The shaft is suspended or levitated by magnetic fields.

FIG. 1 illustrates a cross-section of an example magnetic bearing. In this case the movable member consists primarily of a shaft, 110, which runs perpendicular to the paper. A disk, 109, made of laminated magnetic material is fixed to shaft 110. Four magnets, 101, 102, 103, and 104, are attached to a housing and distributed around the disk, 109. Electrical coils 105, 106, 107, and 108, are wound around the magnets and control the magnetic fields. In most cases, the magnet/coil combinations work in pairs. For example, magnets 101 and 103 work as a pair to control levitation of the shaft in the up/down direction in the drawing, and magnets 102 and 104 likewise work as a pair to control movement in the left/right direction. The housing for this bearing is not shown so that the details of the bearing itself can be shown more clearly.

FIG. 2 is a longitudinal section of a rotor being suspended by three magnetic bearings. Normally, the entire assembly is contained in a housing, which is not shown for clarity. Item 201 is a shaft, which is situated along axis 202. Laminated disk 205 is acted upon by bearing 204, which is shown in simplified form for clarity, but in reality includes an arrangement of magnets like that shown in FIG. 1, and sensors which detect the displacement of the shaft along the two control axes. Assuming a driving motor is positioned to the right in this illustration, bearing 204 is called an "inboard" radial bearing. Likewise, bearing 203 acts on disk 206. Again, assuming a driving motor located down axis 202 to the right, magnetic bearing 203 is called an "outboard" radial bearing. Housing 207 contains what is commonly known as a "thrust" bearing, and contains two electrically controlled magnets, 209 and 210, as well as an appropriate position sensor. These magnets act on disk 208 to control movement and position of the shaft along the axis 202 from left to right. The magnetic bearing system shown in FIG. 2 is an example only. It is possible to devise bearing systems of other shapes, which may have more or fewer bearings and more or fewer magnets in a given bearing. Other types of magnets may be used. In some machines, a thrust bearing may not be needed, for example, when a motor coupling provides axial support. In some applications, only a magnetic bearing on one end of a shaft is used, for example, if the other end is supported by other means. U.S. Pat. Nos. 5,216,308; 5,347,190; 5,543,673; and 5,986,373 provide background and additional information on this and other example magnetic bearing systems, and are incorporated herein by reference.

Generally, sophisticated electronics are required to vary the amount of field produced by the magnets in an electromechanical device such as a magnetic bearing. Control signals are produced for the magnets in response to position signals in order to maintain the rotor in levitation regardless of changing loads and/or mechanical conditions. The present commercial practice for active magnetic bearing control systems is a design in which each axis to be controlled, typically two orthogonal radial directions and one axial (thrust) direction, possesses an independent proportional-integral (PI), proportional-derivative (PD) or proportional-integral-derivative (PID) controller. However, electromechanical devices like magnetic bearings are difficult to control because they are inherently unstable, and so they have found only limited use in industry.

A well-known technique for controlling stable electromechanical systems is to employ the concept of a "unified plant." As an example, consider the control system of FIG. 3. The control system, 302, consists of PID controllers, 303, and a compensator, 304. In this approach, a signal from the plant, P, 301, is passed through a matrix of digital filters in the compensator. The multidimensional filter undoes to some extent the transmission characteristics of the multi-dimensional plant. The filter operates on a vector of error signals measured at point 305. The filtering allows the controller gains to be increased theoretically without limit for an ideal stable plant with no time delay or other non-linearity. The extent to which these gains can actually be increased is limited by how well the filter approximates the plant inverse and by any constraints on the power output.

The system above works well with stable plants. However, many practical electromechanical systems exhibit open-loop instability. Magnetic bearings, for example, exhibit a type of open-loop instability called "negative stiffness." Applying the unified plant approach to such a system is complicated due to the presence of this negative stiffness. To understand what is meant by negative stiffness, assume for the time being the absence of gravity. Allow a shaft to be balanced at its equilibrium position, as shown in FIG. 4. FIG. 4 shows a shaft, 401, and a magnetic bearing made up of four magnets, a left top (LT) magnet, 402, a right top (RT) magnet, 403, a left bottom (LB) magnet, 404, and a right bottom (RB) magnet, 405. If the bearing had positive stiffness, perturbations from equilibrium result in a restoring force that pulls the shaft back to equilibrium. The larger the perturbation, the stronger the restoring force. However, negative stiffness implies an unstable equilibrium. If the forces on the magnets are exactly balanced as shown in FIG. 4, any minute perturbation x causes a force F that grows with increasing distance from the equilibrium position until the shaft hits the stator (the stationary part of the magnetic bearing assembly). Magnetic bearings require a control force to overcome the effect of negative stiffness.

Some form of PI, PD or PID control is generally sufficient to overcome negative stiffness so that the shaft can be levitated. However, in order for the shaft to remain suspended under changing loads, the closed loop positive stiffness, and hence the feedback gains must be large. The resistance of the bearing to motion caused by changing loads is referred to as its "dynamics stiffness". In uncompensated systems, the large feedback gains required for dynamic stiffness cause stability problems related to plant dynamics other than negative stiffness. This will be the case when nonlinear dynamic characteristics (e.g., time-delay) and when cross-response structural resonances are present in the sensor bandwidth. Due to the above-described instability problems, current magnetic bearing control systems have major drawbacks. Such systems exhibit stability sensitivity and relatively narrow controller bandwidth in each direction. There are alternative approaches for improving dynamic stiffness that involve deriving an adequate, low-order model from measurements or simulation data. These are referred to as state-space models. This derivation is not straightforward, and can require significant off-line time by a very skilled practitioner in the control theory and system identification fields. Automated design algorithms are often intractable for complex, highly dynamic, electromechanical systems. Therefore, control systems based on state-space models are difficult to design and expensive to use in commercial applications. What is needed is a new type of control system that can handle open-loop instability such as negative stiffness, but that can also be based on a unified plant so that the control system is more straightforward to adapt to various electromechanical arrangements.

SUMMARY

The present invention solves the above problems by providing a stand-alone, wide-bandwidth control system without the drawbacks of inadequate compensation, cross-coupling sensitivity, and lack of resonance control. A high performance multi-dimensional control system is realized with higher feedback gains, without the attendant threat of instability from uncompensated dynamics. For magnetic bearings, the control system of the invention offers high magnetic bearing stiffness over a wide bandwidth. Implementing this new architecture on a real-time processing platform as a stand-alone system can make the control system of the invention attractive for practical commercial implementation. The control system is particularly useful for magnetic bearings but can be adapted to any. electromechanical device or arrangement that exhibits open-loop instability.

A magnetic bearing system that makes use of the invention includes one or more magnetic bearings operable to suspend a movable member in response to control signals. In one embodiment, sensors are co-located with the bearings to detect displacement of the movable member. The sensors provide sensing signals. A control unit within the control system for the bearings processes the sensing signals. The control unit according to one embodiment of the invention provides, for each bearing/sensor direction, a control signal or an output signal so that the magnetic bearing maintains the movable member in the desired position. The control unit according to one embodiment of the invention includes a specially designed compensation filter, which isolates the negative stiffness by removing substantially all plant dynamics except the negative stiffness characteristic so that the movable member is treated as a pure mass, thus providing for better stiffness, improved bandwidth, and other improved characteristics. The control unit output signal or signals may be the control signal or signals that are fed to a magnetic bearing, or the control unit output signals may be a portion of the control signals or may need to be amplified or otherwise processed to produce the actual control signals.

The control unit according to one embodiment of the invention has inputs for receiving sensing signals, a set-point signal, and a tachometer signal. The control unit outputs an output signal or a control signal for each axis to be controlled. In one embodiment, the control unit includes a resonance controller for adaptively filtering a negated sensing signal and producing a resonance controller output signal from the filter. A summer is connected to the resonance controller, and adds the set point signal and the negated sensing signal with the resonance controller output signal to produce an error signal. A compensation filter, sometimes called, "a compensator", is also connected to the first summer for processing the error signal and producing a compensator output signal. The multi-dimensional compensation filter isolates open-loop instability (negative stiffness in the case of magnetic bearings) so that the movable member is treated as a pure mass. The control unit also includes a band-shaping filter. The control unit in one embodiment also includes a proportional-integral-derivative (PID), proportional-integral (PI), or a proportional-derivative (PD) vector to control signals with a PID, PI, or PD controller, respectively. At some places in this disclosure we use the term "PID vector" or "PID controller" to refer to an element that can be any of these. In many cases, the movable member is a shaft that rotates. The PID controller produces all or a portion of the control unit output signal. A narrowband controller connected to the sensing signal and the tachometer signal input provides a signal that compensates for imbalance forces that occur when the shaft rotates. In this case, another summer adds the PID controller output signal and the narrowband controller output signal to produce the control unit output signal. Instead of a separate narrowband controller to cancel imbalance forces due to shaft rotation, a tracking notch filter is sometimes used to remove those narrowband components from the control signal. The notch filter would typically filter the digitized sensing signal with the frequency of the notch determined by the tachometer signal.

The various filters, summers, and other operators required to carry out the invention are preferably implemented on a programmed processing platform such as a digital signal processor (DSP) or an arrangement of multiple digital signal processors. Such an implementation makes it possible to execute any software or microcode necessary to carry out the high-speed filtering required by the compensator of the invention. The construction of the compensator is typically done off-line, that is by way of background as opposed to real-time processing. Constructing compensators that adjust for changes in the magnetic bearing dynamics requires real-time system identification, as well as processing of the compensation algorithms even though these processes occur at a slower rate than the control processing. The real-time and background processing software or microcode in combination with the processing hardware forms the means to implement the invention. Such a system can be used to implement only the control unit, or it can be used to implement all aspects of the control system.

DETAILED DESCRIPTION OF ONE OR MORE EMBODIMENTS

Control System Overview

Figure 5:
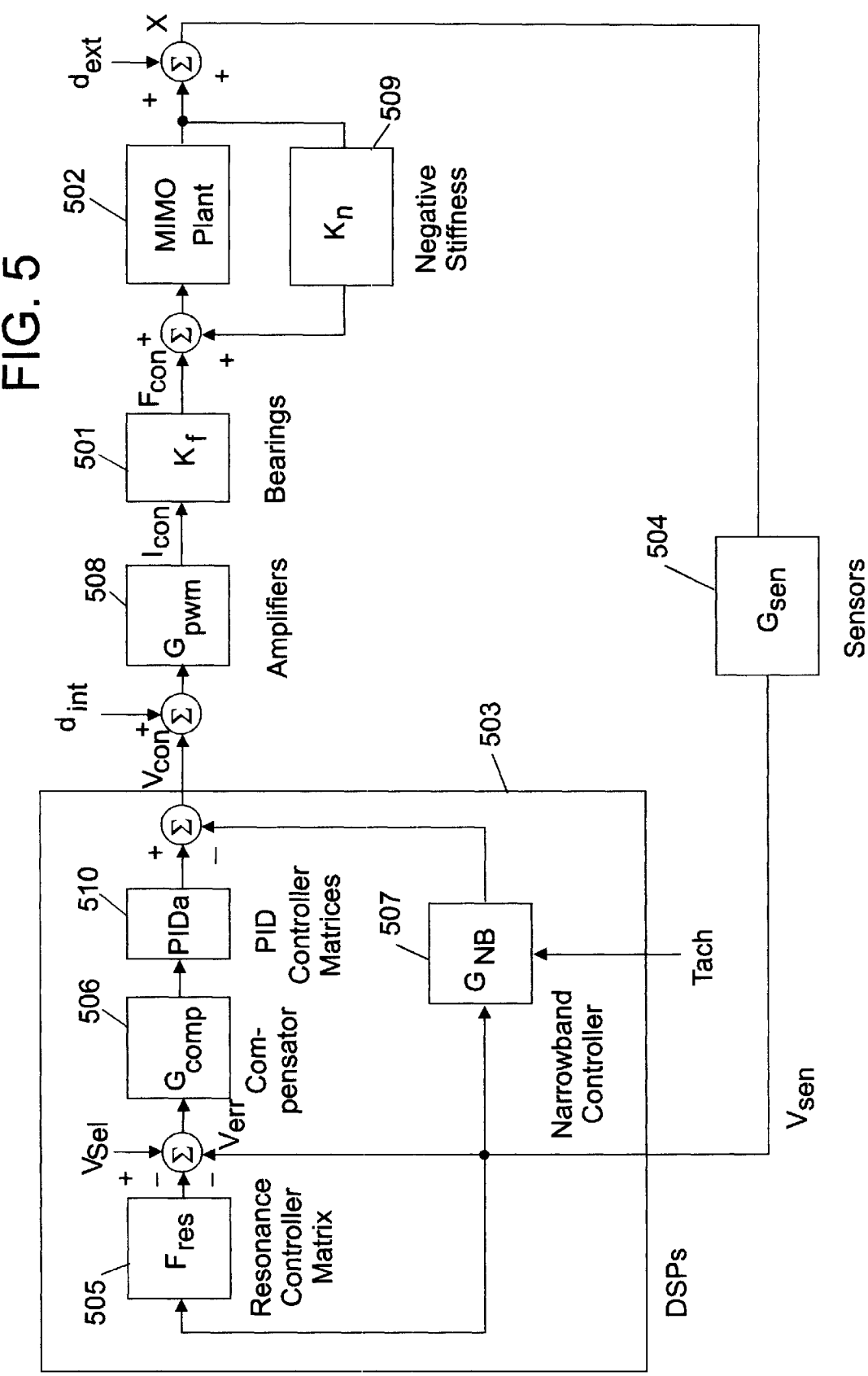
FIG. 5 is a block diagram of a magnetic bearing system for which one embodiment of the present invention is designed to be used.

FIG. 5 depicts the essential elements of a three-bearing control system (two radial, one thrust) where each radial bearing has two controlled axes. It should be noted that the control system of the invention is being shown connected to a magnetic bearing arrangement as an example only. The control system can be adapted to work with other electro-mechanical devices that exhibit open-loop instability. The multi-input multi-output (MIMO) plant, 502, represents the open-loop relationships between control input signals and sensor signals, disregarding the magnetic bearing intrinsic negative stiffness properties shown at 509 as $K_n$. Here, the MIMO plant, 502, is a five by five matrix linking the five controlled axes to the five sensor pairs used to detect shaft displacement from the desired centered position. The $K_n$ block is also a five by five matrix describing the physical negative stiffness relationship between each axis. The current-drive amplifiers, $G_{pwm}$ (five total), 508, are pulse-width-modulated amplifiers that deliver current to each of the five bearings. Bearing gain $K_f$ (five by one vector), 501, simply depicts the relationship between current flowing in the electromagnet coils and the resultant force applied to the shaft (rotor). Sensor gain $G_{sen}$ (five by one vector), 504, converts absolute displacement in mils to a voltage signal that the control system can operate on.

Within block 503 labeled DSP's is the proposed compensation and controller architecture, which we call the "control unit", depicted in block diagram form. Block 506 labeled $G_{comp}$ includes the compensation filter matrix and a control band shaping filter vector. The compensation filter is designed using least-squares methods to unify and orthogonalize the open loop plant. The negative stiffness characteristic is isolated, as further described later, during the compensation filter calculation so that only the stable open loop dynamic elements of the MIMO plant are included in the calculation. This form of compensation makes the compensated system appear as a pure mass (no open-loop structural properties such as resonances) in each of the controlled directions with no cross-coupling between axes. As a result, five independent PID controllers in block 510 can be provided without additional consideration given to high frequency uncompensated dynamics. The compensation filter matrix has already produced the de-coupled compensation over a bandwidth much wider than the desired closed loop bandwidth. A final element in the $G_{comp}$ block is the control band shaping filter (five by one vector). This filter shapes the control band to limit controller response to the desired frequency regions as well as provide robustness to out-of-band sensor noise and high frequency estimation errors associated with the least squares curve fitting algorithms.

The $F_{res}$ block, 505, contains a five by five matrix of finite impulse response (FIR) filters that also operate directly on the sensor signals. The elements of this matrix are designed according to a known filtering technique designed to suppress resonant dynamics in structures. This filtering technique is described in U.S. Pat. No. 5,816,122, which is incorporated herein by reference. Calculation of the filter coefficients is performed after the inner control loops are closed. Dynamic measurements are then performed to characterize any resonances in the closed-loop response. The remaining block, 507, within the DSP environs is the narrowband controller, $G_{NB}$. This five by one vector is a multi-dimensional, adaptive narrowband control signal constructed from the sensor signal and from the tachometer signal, which measures the shaft rotation speed. The narrowband control signals reduce synchronous motion and/or forces induced from rotor imbalances or shaft loading at frequencies associated with rotor speed. Alternatively, tracking notch filters operating directly on the digitized sensor signals can be used to remove from the control signal the synchronous narrowband components caused by imbalances and loading of the shaft, consequently removing synchronous restoring forces from the overall control system.

Additional signals are indicated in FIG. 5. $V_{con}$ is the output voltage or control signal being produced by the control unit. $I_{con}$ is the current flowing in the magnetic coils of the bearings. $F_{con}$ represents the control forces for the rotating shaft (rotor). In FIG. 5, $d_{ext}$ is the disturbance signal component of the measured displacement caused by external forces acting on a suspended rotor. $d_{int}$ is an internal disturbance signal that enters through the same path as the control signal. $V_{sen}$ is the output voltage from the magnetic bearing sensors, $V_{set}$ is a set point voltage that corresponds to the desired position of the rotor, and $V_{err}$ is an error voltage signal that is derived by taking the difference between the desired and measured position voltages and adding it to the output of the resonance controller. "tach" refers to a tachometer speed reference signal.

Figure 6:
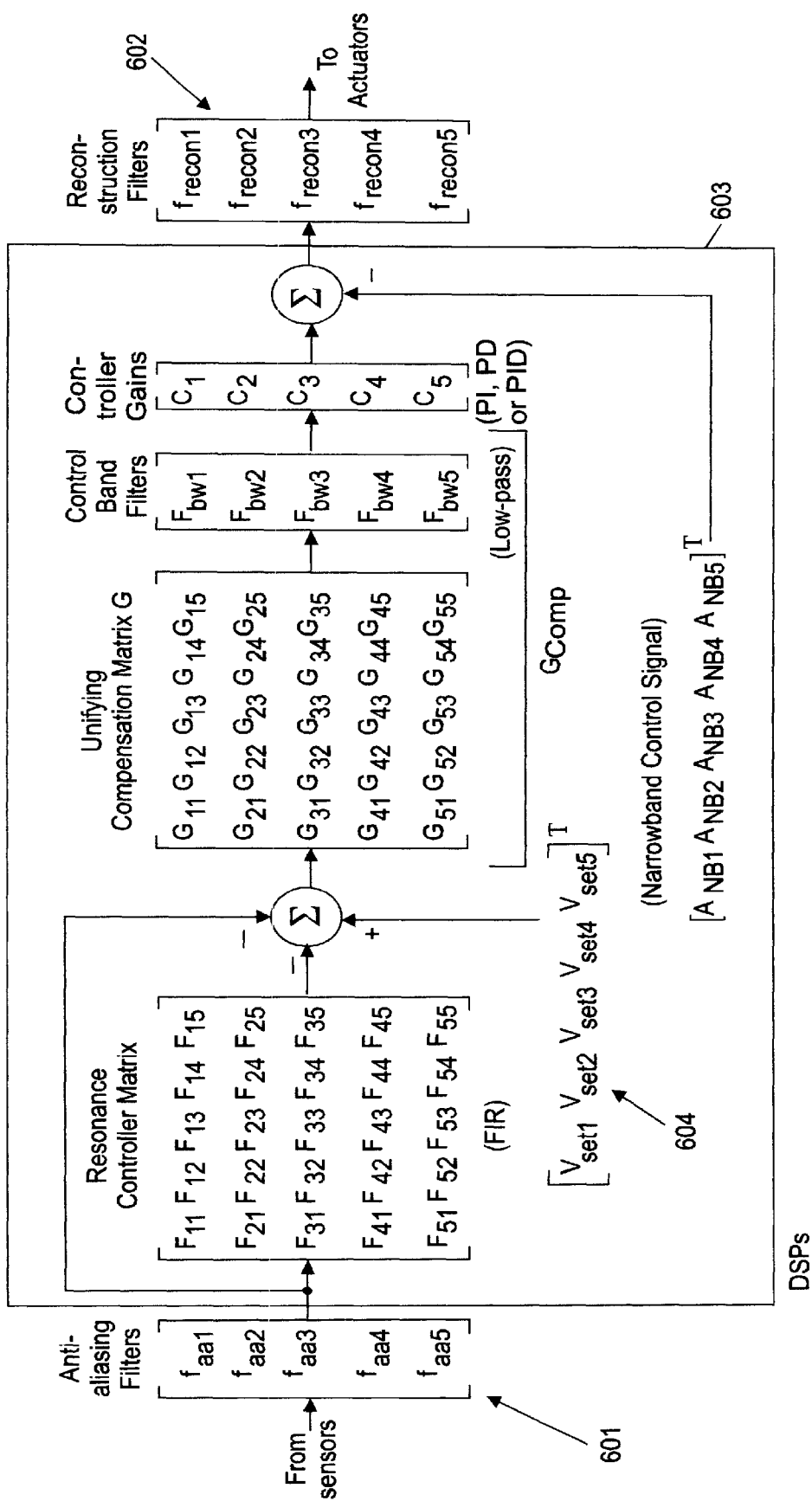
FIG. 6 is a detailed diagram of an embodiment of the invention showing the method of the invention and arrangement of DSP operators used in a control unit according to the invention.

FIG. 6 shows a representation of the signal flows for the real-time DSP application implemented by the DSP block (503 of FIG. 5 and 603 of FIG. 6). The DSP block forms the control unit, which is the "heart" of the control system of the invention. Signal flow from the sensor inputs to the actuator drive signals (amplifier inputs) is depicted relative to vector and matrix operators. Each line with an arrow represents a five by one signal vector. Anti-aliasing filter vector 601 represented as having entries $f_{aa}$ was omitted from FIG. 5 for clarity. Likewise, reconstruction filter vector 602 having entries represented by $f_{recon}$ was omitted from FIG. 5 for clarity. The set point voltage matrix, 604, is shown in more detail in FIG. 6 than was shown in FIG. 5. The resonance controller and compensation matrices and the PID controller vector from FIG. 5 are also shown in more detail in FIG. 6. The adaptive narrowband controller from FIG. 5 is also included. Although the narrowband control signal is constructed from the sensor signal and the tach signal, it does not multiply the sensor signal, as do the filters in the wideband control path. Alternatively, tracking notch filters that take the tach signal as input and multiply the digitized sensor signal could be placed after the anti-aliasing filters.

Understanding and Measuring the Plant

In the traditional unifying plant approach, the plant is obtained as follows. A probe signal (band limited white noise filtered by a shaping filter) is applied to the plant and the resulting effect on the error signal is measured. The correlation between the applied probe signal and the error signal determines the transfer function P between each actuator-sensor pair. P is referred to as the plant. Typically the transfer function is expressed in the frequency domain and its amplitude and phase determine the transmission characteristics of the medium. Applying a probe signal in each of the NA actuation directions and measuring the effect at each of the NE errors results in an NA×NE matrix $P(\omega)$ of transfer functions. $\omega$ is the frequency in radians per second. The process of unifying the plant for a MIMO system involves taking the matrix inverse of $P(\omega)$ at each frequency picket $\omega$ and fitting each resulting matrix element with an infinite impulse response (IIR) filter which is the best fit to the inverse transfer function in the least squares sense. The fit is obtained by coming as close as possible to satisfying:

$$\Sigma_\omega |P^{-1}(\omega) - G(\omega)|^2 \cong 0.$$

$G(\omega)$ is expressed as a ratio of polynomials in $z^{-1}$ by:

$$G = \frac{b_1 + b_2 z^{-1} + b_3 z^{-2} + \ldots}{a_1 + a_2 z^{-1} + a_3 z^{-2} + \ldots}$$

where $z^{-1}$ represent a one-sample delay. $z^{-1}$ is given in terms of $\omega$ and the sample rate SR by $z^{-1} = e^{-i\omega/SR}$. Fitting the filter involves finding the coefficients $b_i$ and $a_i$ that minimize the least squares equation for each pair of actuators and errors. Implementing the digital filter in the form shown above as a ratio of tapped delays results in very noisy high order filters. A better approach, once $b_i$ and $a_i$ have been determined, is to use these coefficients to determine the poles and residues of G. Complex conjugate pairs are then combined to form biquads (or second order sections) with real coefficients. Likewise, the remaining real poles are combined by pairs into biquads, resulting in a filter having sections similar to that shown in FIG. 7.

Figure 7:
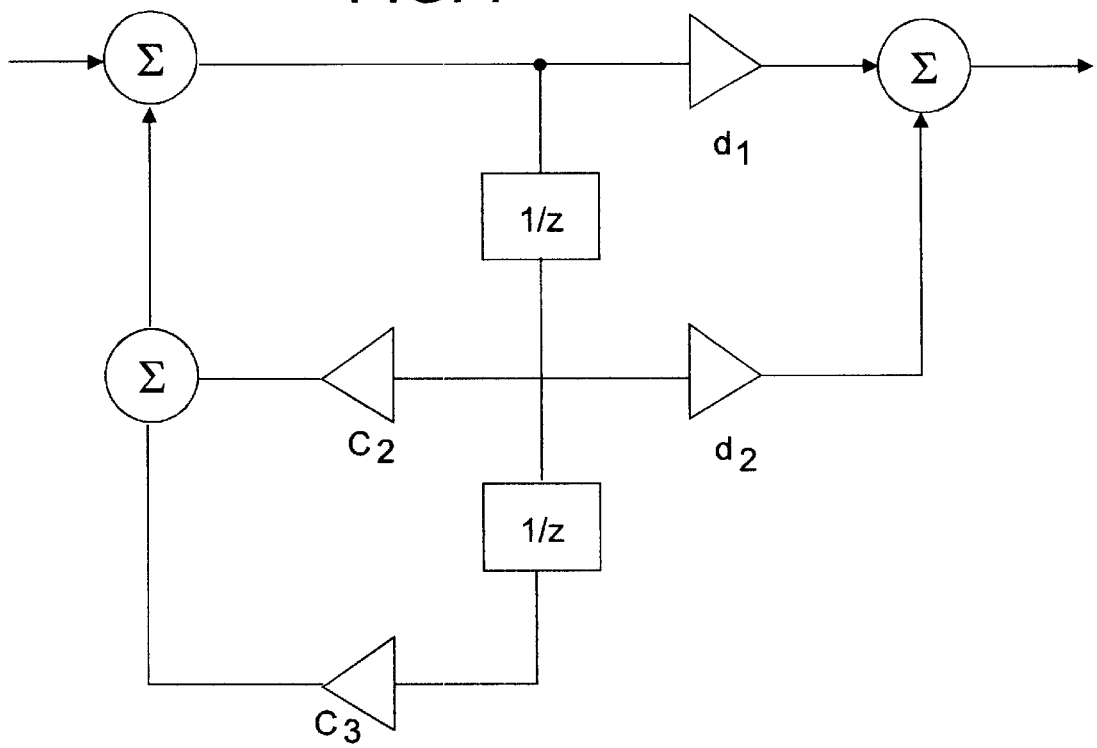
FIG. 7 is a block diagram of a biquad section of a filter that is used with the invention.

FIG. 7 illustrates a typical filter section. The legends for the filter elements match the equation for the transfer function:

$$G = \sum \frac{d_1 + d_2 z^{-1}}{1 - c_2 z^{-1} - c_3 z^{-2}}$$

The c and d coefficients have as a dimension the number of actuators (NA) times number of errors (NE) times the number of second order sections (nsect), or NA×NE×nsect. The summation is done over the number of biquad sections. The number of sections nsect is one more than the filter order divided by two. Each biquad is order two; the additional section corresponds to the constant term in the definition of the filter. As defined above, G is a matrix of NA×NE filters.

Negative stiffness has previously been discussed. A mathematical description of positive and negative stiffness comes from the equation of the harmonic oscillator (or spring-mass system), which states that the acceleration $\ddot{x}$ is proportional to the displacement x in such a system, with k the stiffness and m the mass:

$$m\ddot{x} = -kx$$

The solutions to the above equation are $x = Ae^{i\omega t} + Be^{-i\omega t}$ with A and B determined by initial conditions and with the frequency of oscillation in radians per second given by:

$$\omega = \sqrt{\frac{k}{m}}.$$

If the stiffness k is negative then the two oscillatory solutions become a decaying solution and a growing solution: $x = Ae^{-\alpha t} + Be^{\alpha t}$ with $\alpha = -i\omega$. A growing solution means that the dynamics are unstable.

Due to the negative stiffness, it is not possible to directly measure the plant. The plant must be inferred by measuring the closed loop transfer function with the PID controller operating and then extracting with offline processing the unstable plant, which has a well-defined frequency representation despite being unstable. The procedure is to apply just enough control gain to levitate the shaft. This involves either trial and error or some a priori knowledge of the negative stiffness from known properties of the magnets. Then a probe is turned on sequentially for each of the five actuation directions, and data is collected at the five error sensors and at the five outputs of the PID controllers. The transfer function data for the outputs of the PID controllers is in some sense redundant. Knowledge of the PID parameters alone is sufficient to determine this transfer function without measuring it.

Figure 8:
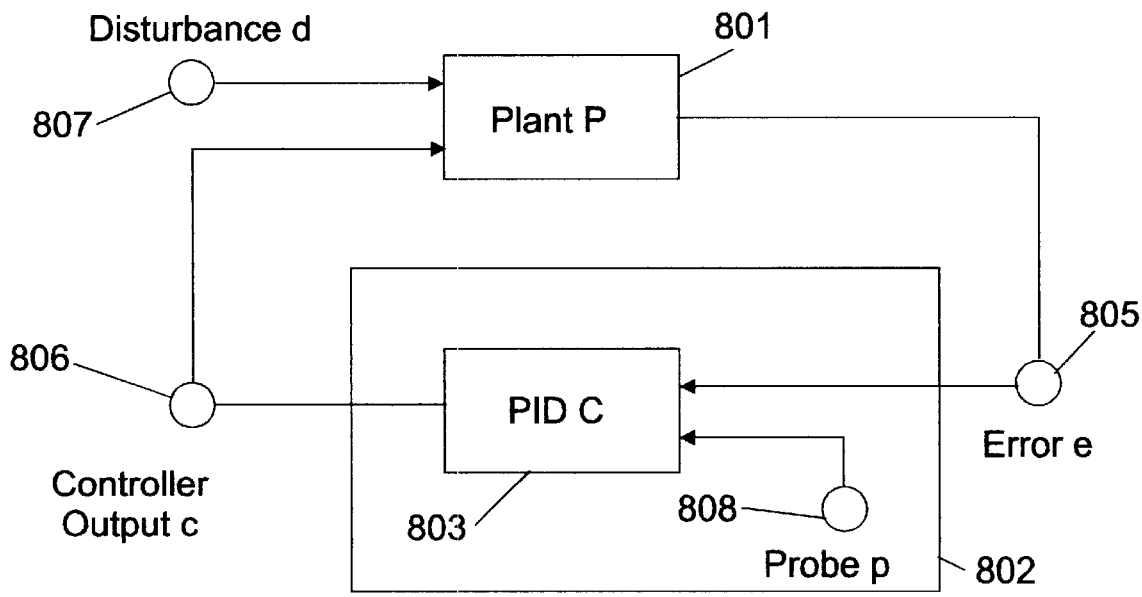
FIG. 8 is a block diagram illustrating how measurements are taken to implement the invention.

FIG. 8 shows a test system block diagram with plant 801, having a transfer function P, and PID controller 803 within a control system 802. The PID controller has the transfer function C. FIG. 8 shows point 805 for measuring the error signal, e, point 806 for measuring the controller output signal, c, point 807 for including a disturbance signal, d, and point 808 for applying the probe and measuring the signal p. The vector equation relating the error signal to the probe and disturbance signals is:

$$e=PC(p+e)+Pd.$$

The equation for the control output is given by:

$$c=C(p+e).$$

e, p and c are Fourier transforms of vector error, probe and control time series, respectively. The transfer function from the probe to the errors is:

$$X = \frac{\langle ep^* \rangle}{\langle pp^* \rangle} = [I - PC]^{-1}PC.$$

* is a complex conjugate, < > indicates averaging over several sets of Fourier-transformed data and I is the identity matrix. The disturbance d is uncorrelated with the probe. This matrix equation represents the closed loop transfer function that is measured between each probe and each error signal when the controller is turned on. The closed loop transfer function through the controller is:

$$Y = \frac{\langle cp^* \rangle}{\langle pp^* \rangle} = C + CX = C[I - PC]^{-1} = P^{-1}X.$$

The final result in the above equation uses the fact that PC and $[I-PC]^{-1}$ commute. The open loop plant is given in terms of X and Y by:

$$XY^{-1}=P.$$

X and Y are direct measurements of closed loop transfer functions computed from control, probe and error time series. The above relationship between X and Y transfer functions can be observed from the fact that for e in FIG. 8, e=P(c+d) and d is uncorrelated with the probe signal.

An alternative way of determining P is to compute the open loop controller transfer function C from known PID gains. In this case the only required measurements are probe and error time series. From the definition of X above:

$$P=X[I+X]^{-1}C^{-1}.$$

Figure 1:
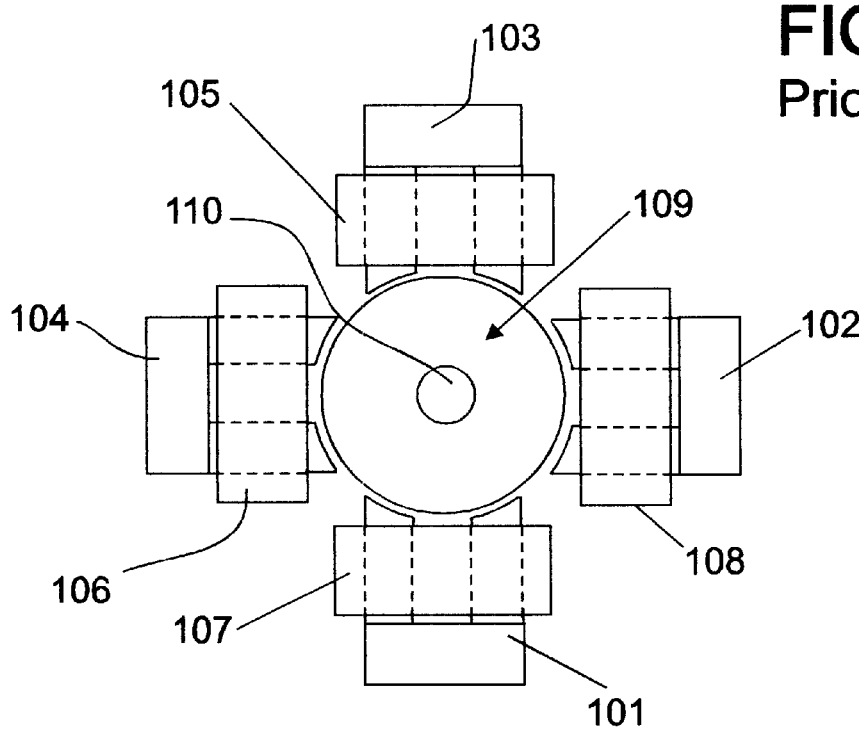
FIG. 1 is a cross section of one type of magnetic bearing with which the present invention might be used.
Figure 2:
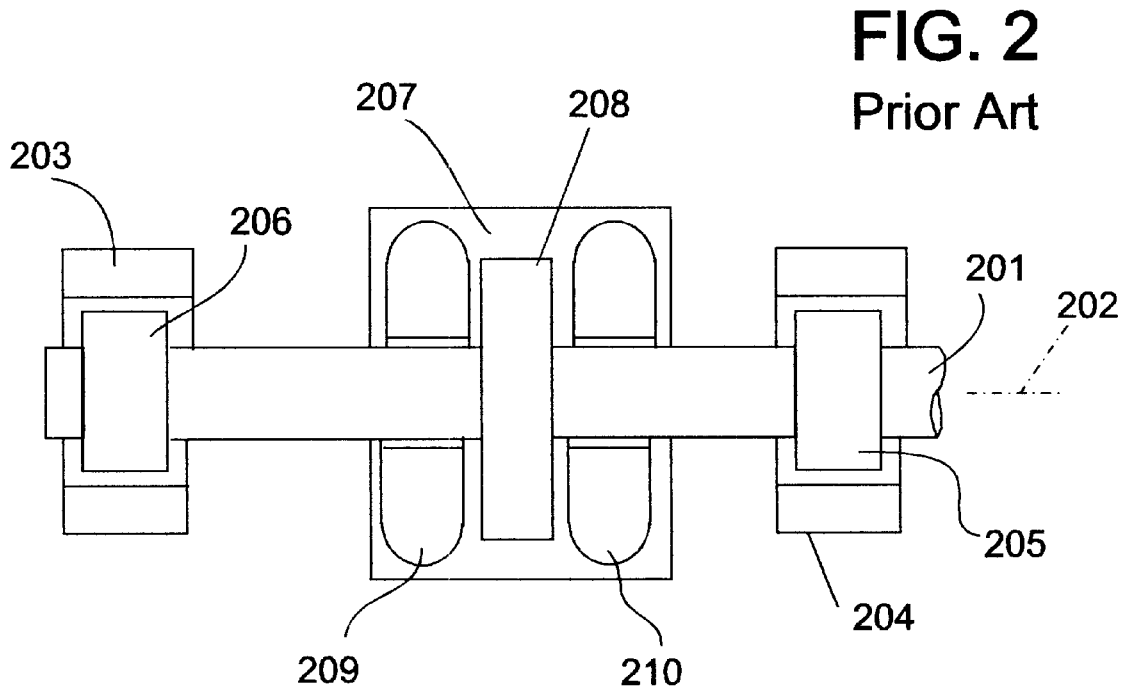
FIG. 2 is a longitudinal section of an arrangement of magnetic bearings suspending a shaft.
Figure 3:
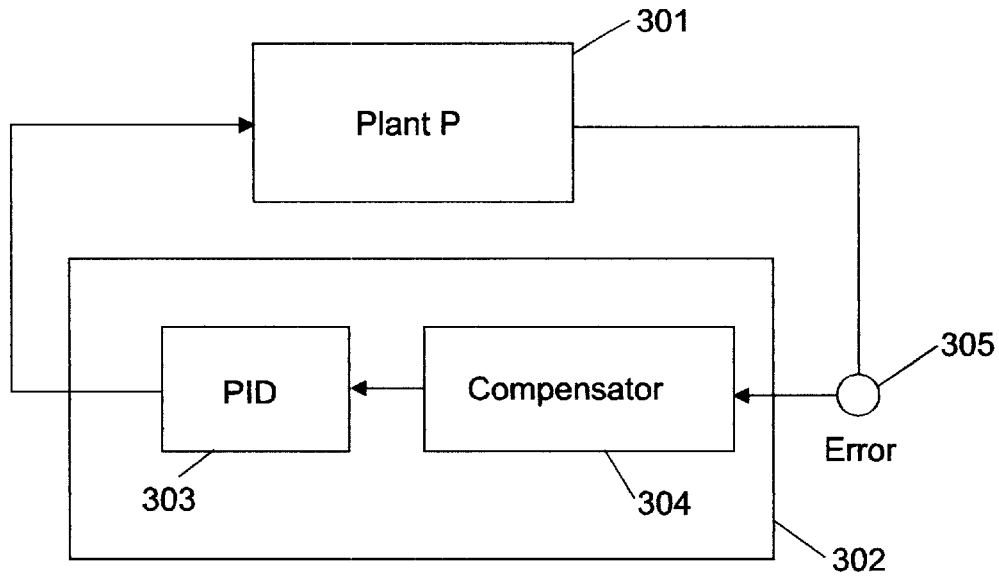
FIG. 3 is a block diagram of a known control system for stable plants.
Figure 4:
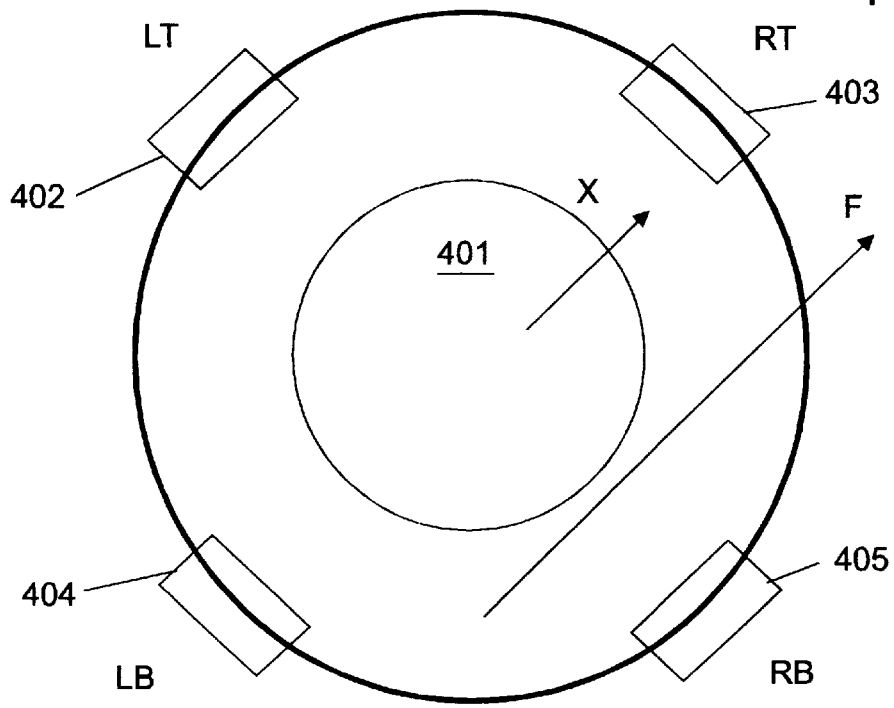
FIG. 4 is a simplified cross section of a magnetic bearing illustrating the principle of negative stiffness.
Figure 9:
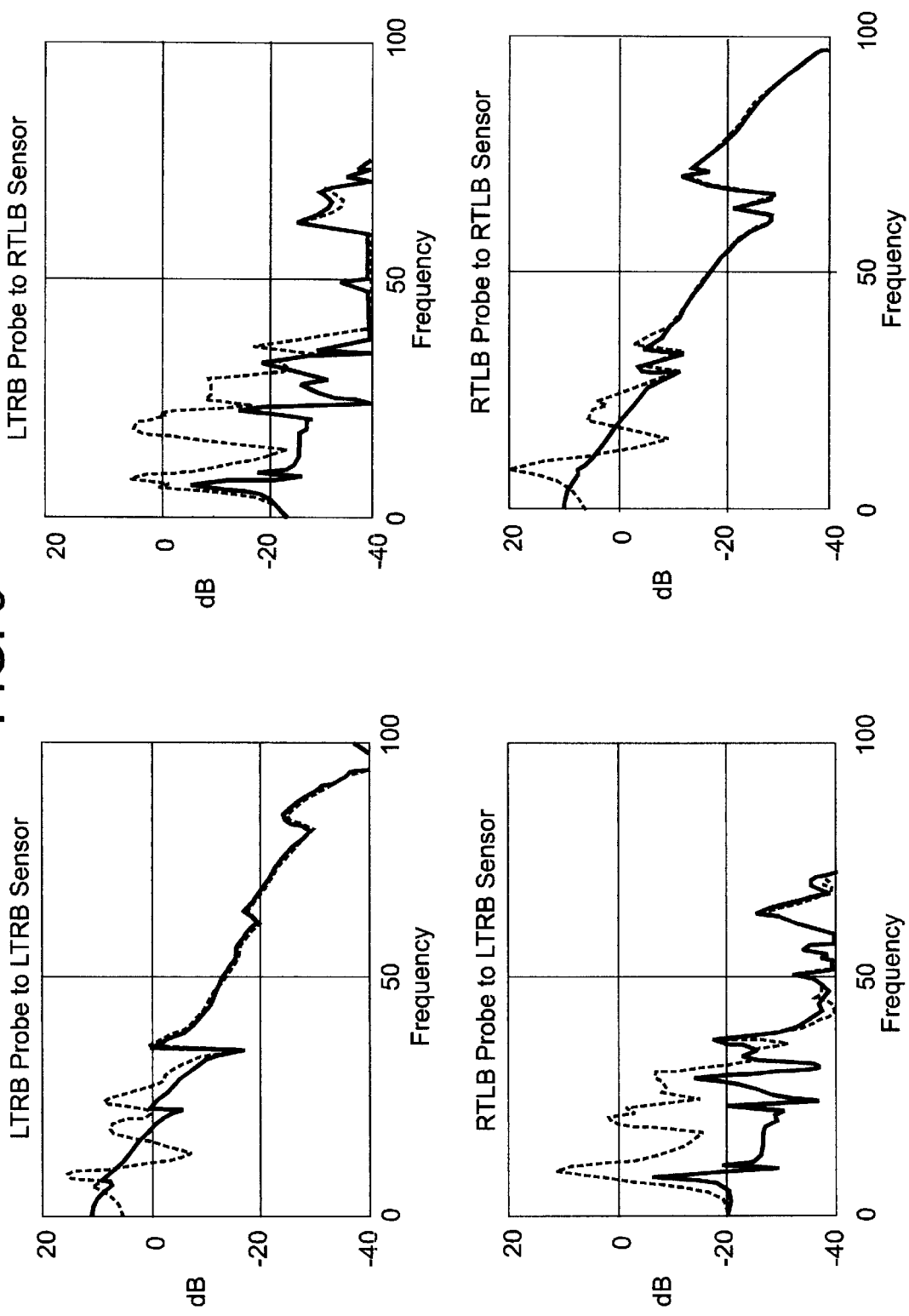
FIG. 9 illustrates graphs of measured closed loop (dotted) and derived open loop (solid) transfer function amplitudes that are used to construct the compensator for implementing the invention.
Figure 10:
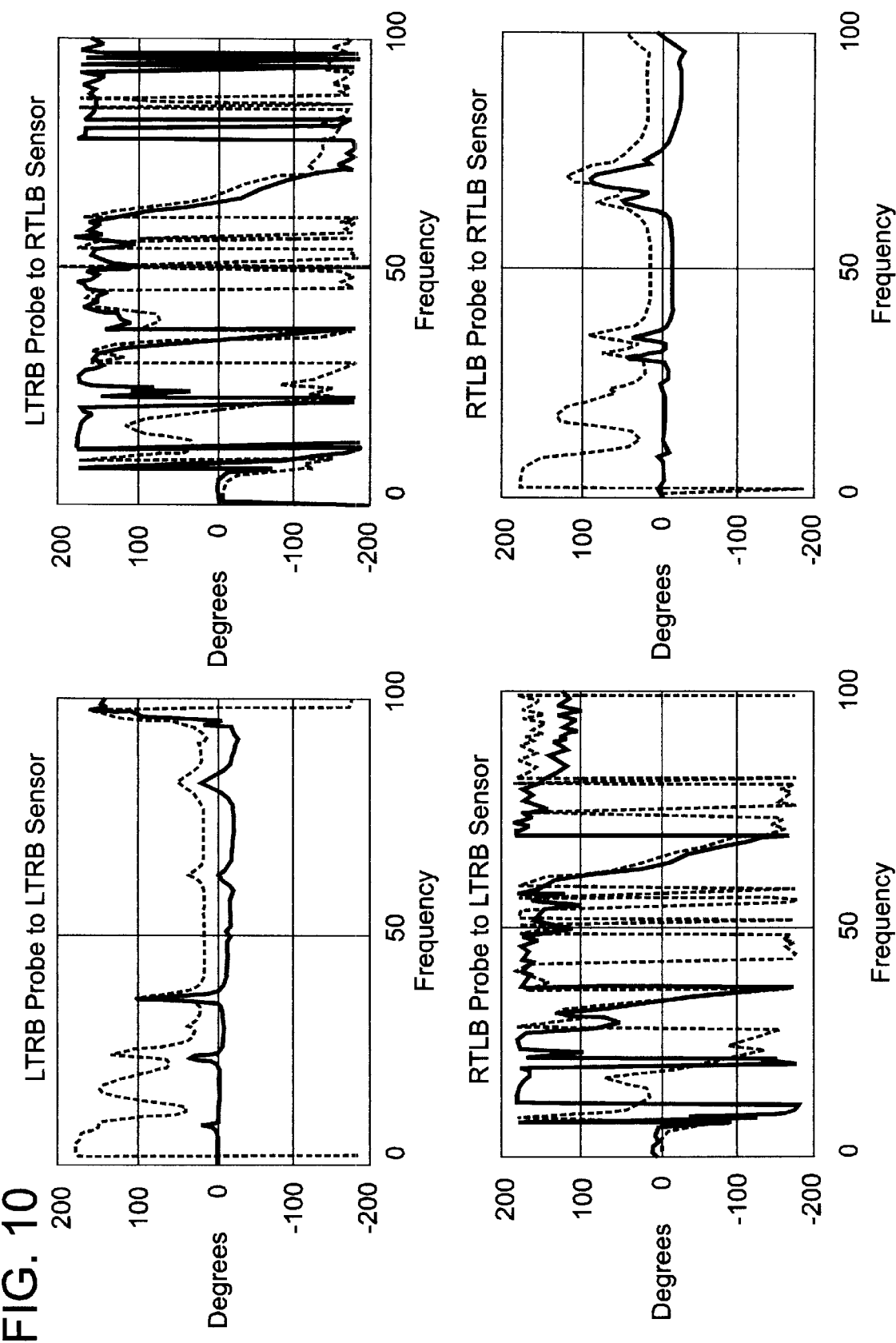
FIG. 10 illustrates graphs of measured closed loop (dotted) and derived open loop (solid) transfer function phases that are used to construct the compensator for implementing the invention.

The first method is preferred because it is closer to a direct measurement, that is, X and Y are both measured whereas C must be calculated theoretically. FIGS. 9 and 10 show graphs of measurements for the open loop plant P overlaid on the closed loop measurement X for one radial bearing. The dotted traces represent the closed loop measurements and the solid traces represent the open loop measurements. Two directions are shown: left top to right bottom (LTRB); and right top to left bottom (RTLB). These correspond to the directions previously discussed as shown in FIG. 4. FIG. 9 shows the amplitudes and FIG. 10 the phases. In the figures, actuator directions correspond to the rows and the error directions to the columns. The plant P is temporally unstable although its spectral representation is well-defined.

Isolating the Negative Stiffness

In order to construct a unifying compensator for the plant P, it is necessary to identify the negative stiffness and isolate it. The most straightforward way of doing this is to fit the plant directly with an IIR filter and find the unstable poles. Alternatively, a condition of minimum phase can be imposed on the inverse plant. Assuming the direct fit method is used, after an examination of the unstable poles, it is found that the plant can be cleanly separated into a product of a fully-coupled stable part and a diagonal unstable part:

$$P=\hat{P}D$$

with the matrix elements $D_{ij}$ given by:

$$D_{ij} = \frac{2 - (\beta_i + \beta_i^{-1})}{1 - (\beta_i + \beta_i^{-1})z^{-1} + z^{-2}} \delta_{ij}.$$

$\delta_{ij}$ is the Kronecker delta: 1 if i=j and 0 otherwise. The above denominator is a product of two poles $\beta$ and $\beta^{-1}$, which are related to the $\alpha$ of the growing and decaying solutions defined by $\beta=e^{\alpha/SR}$ where SR is sample rate. Only one of the poles (the growing one) is unstable. Both poles are removed so that D can be made to resemble a spring-mass system. The above numerator is just a normalization designed so that at DC ($\omega=0$&z=1), $D_{ii}=1.0$.

Although the above decomposition of P may appear no more than a mathematical construct, it is in fact a physically meaningful decomposition. The negative stiffness poles in P are removed by multiplying each column of P by the reciprocal of $D_{ii}$ above. Although the matrix elements between different directions on the same bearing are essentially zero (eg. $P_{21}$), the matrix elements between the same direction on two different radial bearings ($P_{31}$) have their unstable poles at approximately the same location as matrix elements between a collocated actuator and sensor ($P_{11}$). The new plant, $\hat{P}$, that remains after removing the negative stiffness is either stable or occasionally has higher-order unstable poles that are likely artifacts of the fitting process.

In the matrix D above, only one pair of poles $\beta_i$ is identified for each of the five directions. In fact, based on the rigid body model, there can be two unstable poles per direction corresponding to two rigid body modes. In that case, the denominator in D would be a product of the two pairs of poles. Experimental filter fits of P have only identified one pair of poles, which can be assumed to be the dominant contribution to D. In addition, it is usually the case that not all of the poles in the five directions are unique. The stiffness is a property of the magnet and is approximately the same in each bearing direction. Given the above discussion of the spring mass system, the location of the poles is determined by the stiffness and by the mass supported by the bearing axis. For the bearing configuration shown in FIG. 4, with each direction supporting half of the weight at that bearing, the poles are at approximately the same location. If, in addition, each radial bearing supports half the rotor weight then four of the five poles will be the approximately the same. In one test setup used to verify the invention, one radial bearing supported about twice the weight of the other and the location of the poles reflected this fact.

Figure 11:
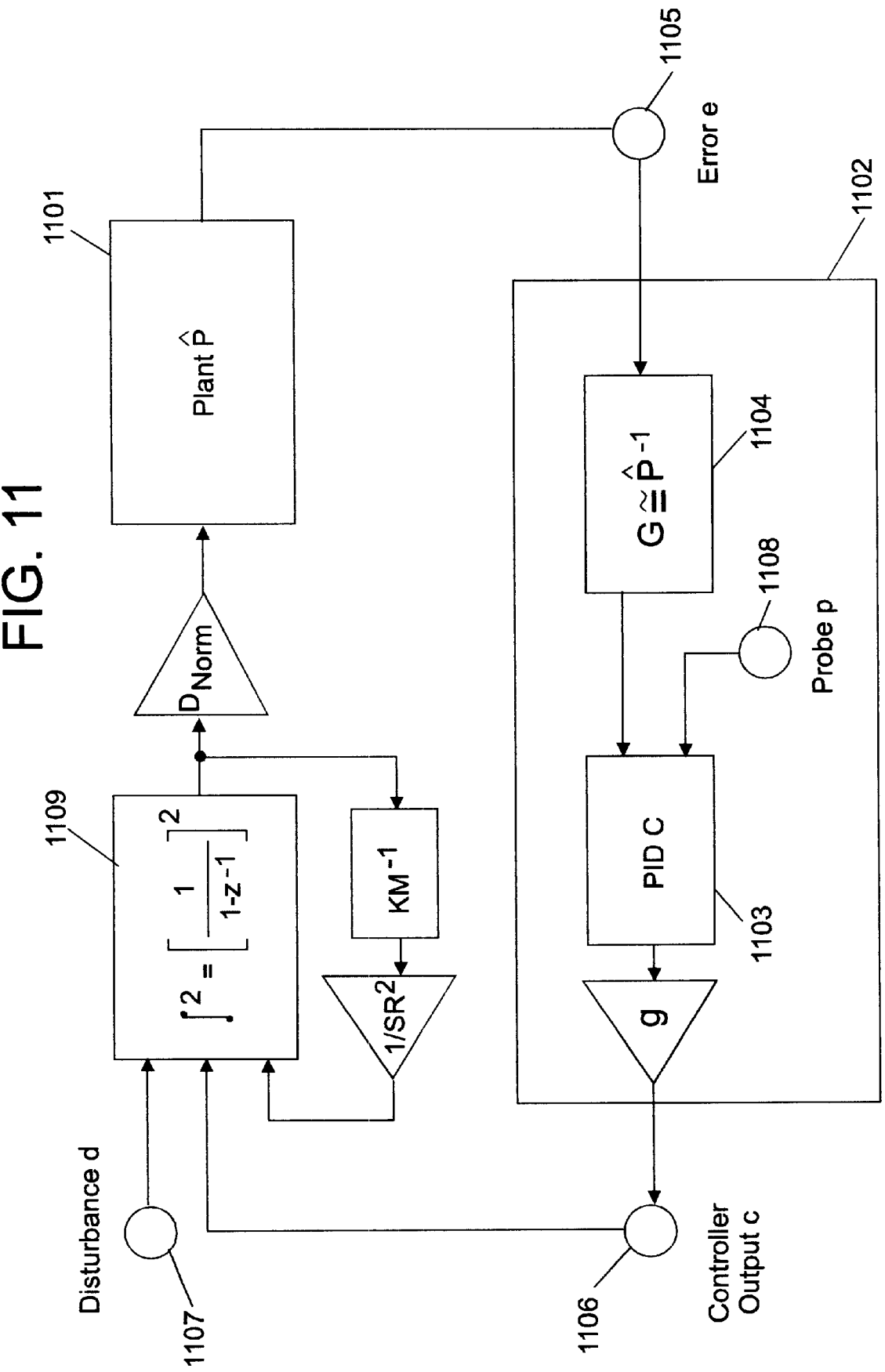
FIG. 11 is a block diagram illustrating how a compensation filter according to the present invention is designed to isolate negative stiffness in the plant.

FIG. 11 shows how the unifying plant concept is applied when the plant has negative stiffness. Error signal e measured at point 1105, controller output signal c measured at point 1106, and probe signal p measured at point 1108 are shown as before. Filter 1104, with transfer function G, is designed such that $G\hat{P} \cong I$. Filter 1104 is disposed within control system 1102 as before. The spring-mass system is described as a second order differential equation. The transfer function between an applied force and the displacement involves two integrations, which can be expressed in the z-domain as $[1/(1-z^{-1})]^2$, as shown at 1109. The negative feedback is described by K/M (or $KM^{-1}$), which is diagonal but can be different in each of the five directions. The transfer function from the disturbance input, 1107, to the input at the new plant 1101 ($\hat{P}$) can be shown to be D when one makes the identification:

$$\ln\beta = \sqrt{\frac{k}{m}} \frac{1}{SR},$$

and uses the fact that $1+\ln\beta \cong \beta$ and $1-\ln\beta \cong 1/\beta$. In the above k, m and SR are, respectively, stiffness, mass and sample rate. Then $[(1-z^{-1})^2-(\ln\beta)^2]$ can be factored into $(\beta-z^{-1})(\beta^{-1}-z^{-1})$. $(\ln\beta)^2$ is $KM^{-1}$ multiplied by a gain of $1/SR^2$ as shown. These are very good approximations at the high sample rates typically used for magnetic bearings (~10K).

The PID control signal transfer function may be expressed in the z domain as a diagonal matrix:

$$C_{ij} = [\lambda_{Pi} + \lambda_{Di}(1-z^{-1}) + \lambda_{Ii}/(1-z^{-1})]\delta_{ij}$$

where $\lambda_P$, $\lambda_D$ and $\lambda_I$ are respectively the proportional, derivative and integral gains. The proportional gain will have the effect of shifting the poles in D inside the unit circle provided that the applied gain is sufficient to overcome the negative stiffness. Assuming $G=\hat{P}^{-1}$ and assuming that $\lambda_D$ and $\lambda_I$ are both zero, the denominator of the closed loop transfer function becomes:

$$1 - g\lambda_{Pi}D_{norm} - (\beta_i + \beta_i^{-1})z^{-1} + z^{-2}$$

with $D_{norm}$, the normalization, given by $D_{norm}=2-(\beta_i+\beta_i^{-1})$. The unstable pole $\beta_i$ of z (not $z^{-1}$) is shifted according to:

$$\beta_i \rightarrow \frac{(\beta_i + 1/\beta_i) + \sqrt{(\beta_i + 1/\beta_i)^2 - 4(1-g\lambda_{Pi}D_{norm})}}{2(1-g\lambda_{Pi}D_{norm})}$$

which is within the unit circle provided that the above quantity is less than one. This true whenever:

$$g\lambda_{Pi} > 1$$

Although many of the calculations, like the one above, are simpler in the s-domain, the filters are implemented in the z-domain and so an understanding of the processing in the z domain is useful in understanding the invention. The gain g within control system 1102 is chosen such that g approximately equals the diagonal values of $\hat{P}$ at $\omega=0$. That is, the original DC offset of the plant is put back in order to keep the PID parameter settings in the same range with compensation as without.

Figure 12:
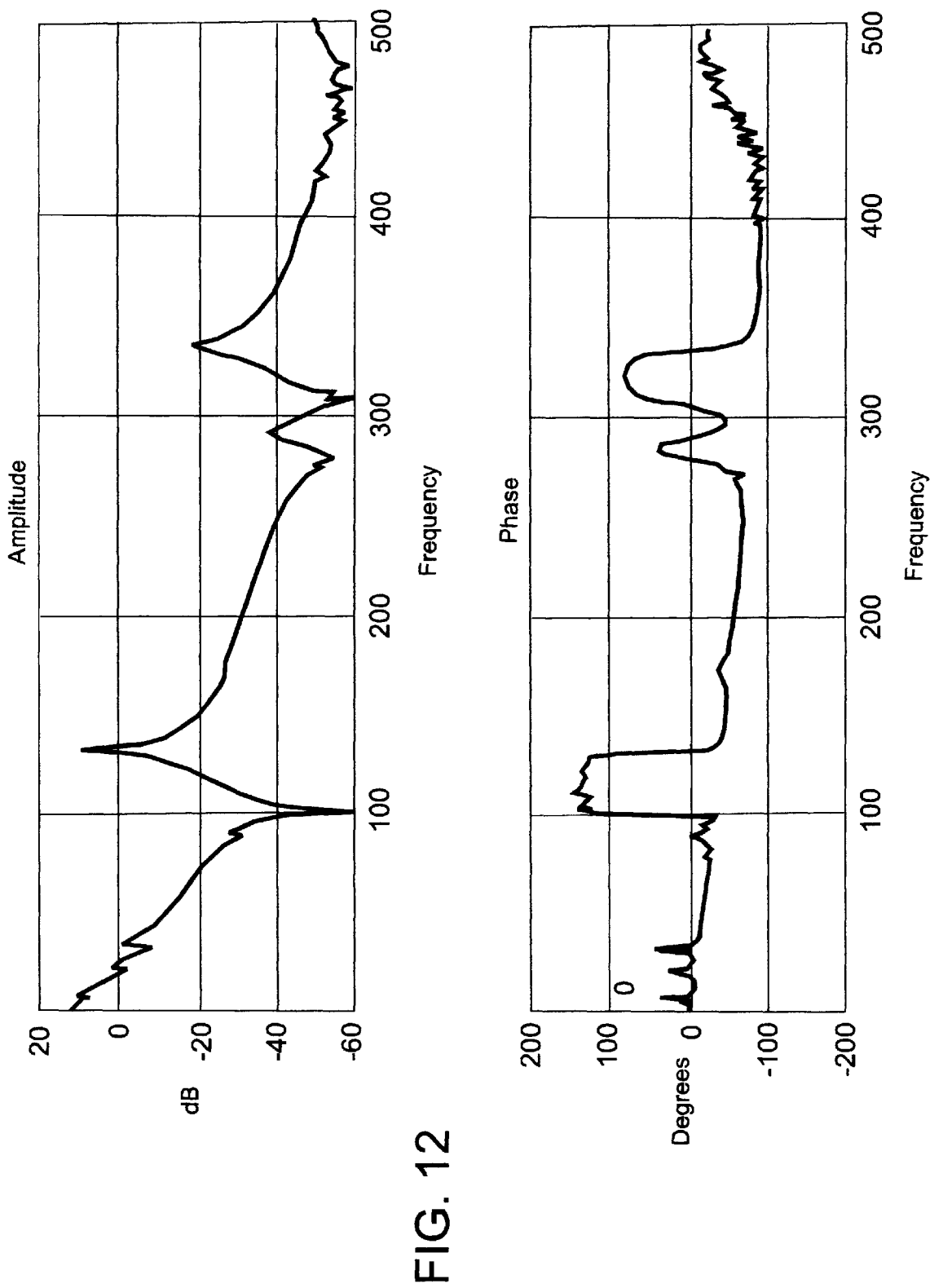
FIG. 12 illustrates graphs showing measurements of the plant according to the present invention with negative stiffness included.
Figure 13:
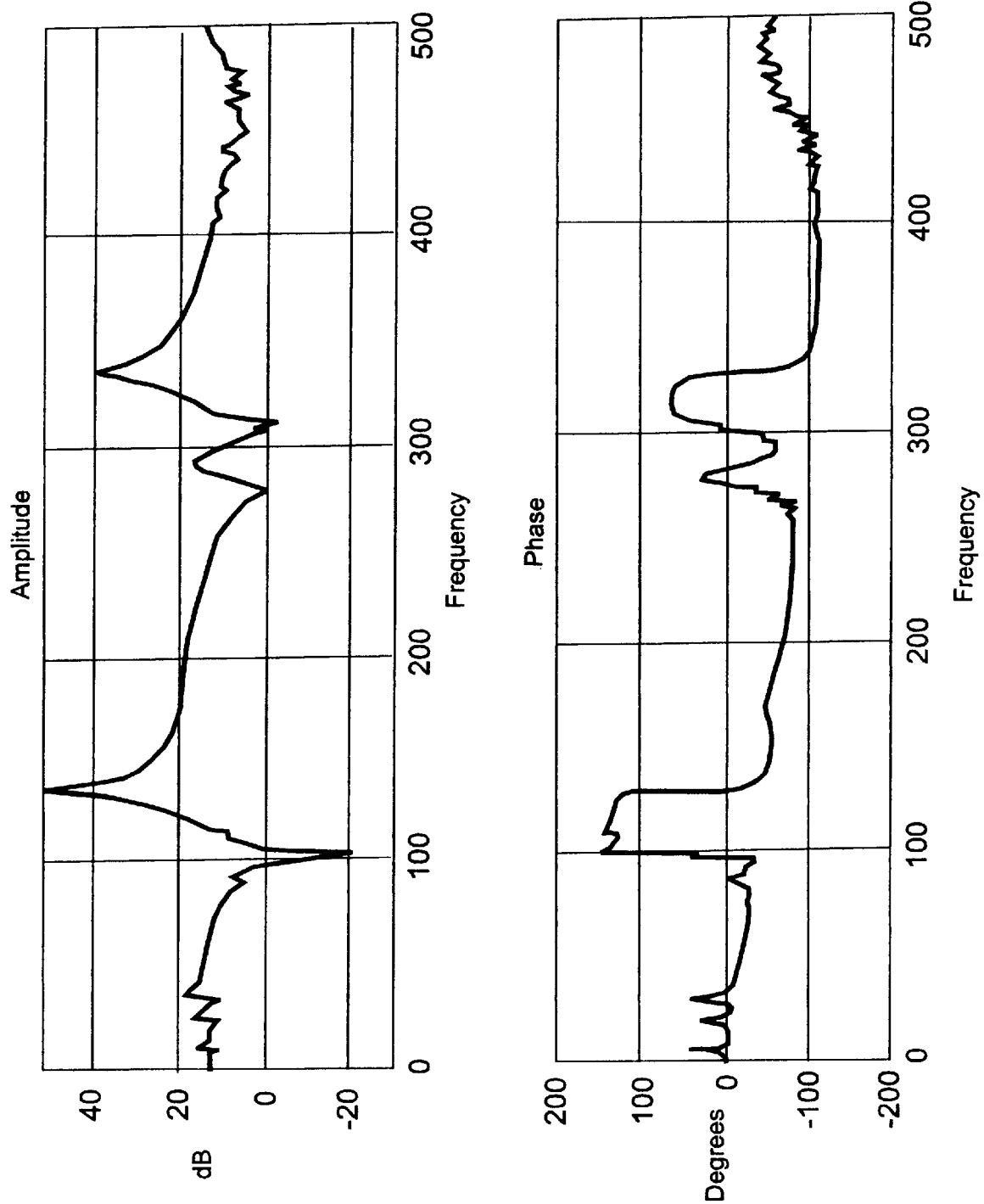
FIG. 13 illustrates graphs showing measurements of the plant according to the present invention without negative stiffness.

FIGS. 12 and 13 are plots of one matrix element of the plant with (FIG. 12) and without (FIG. 13) the negative stiffness included. FIG. 13 is a plot of $\hat{P}$. Notice that except for the flexible modes at 135 Hz and 335 Hz, the transfer function of $\hat{P}$ is essentially a wire with delay as indicated by the phase slope. The gain of the wire is 10 dB, which gives us the value g=3. It follows that $\lambda_{Pi}$ is about 0.3. In fact, the input parameter for the proportional gain was chosen to approximately scale with the resonant frequency so:

$$\sqrt{\lambda_{Pi}}$$

was used. It was found that the minimum value of this parameter required to levitate the shaft was about 0.6, which is about equal to:

$$1/\sqrt{g} \text{ for } g=3.$$

Unfortunately, g cannot be measured until the shaft is levitated, so the initial estimate for g must be based upon some a priori knowledge of the negative stiffness (g is roughly the reciprocal of the stiffness) or determined by trial and error.

Figure 14:
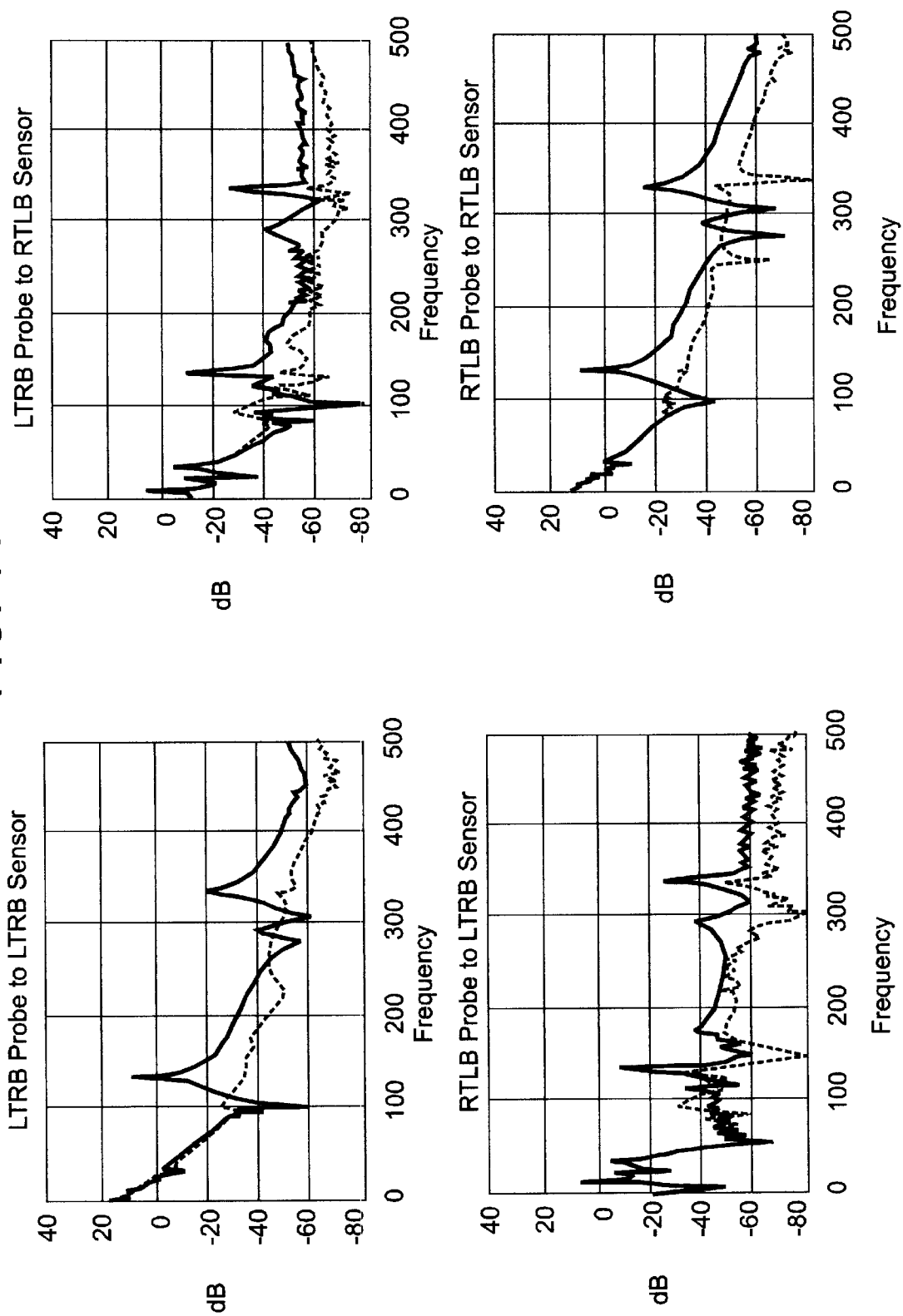
FIG. 14 compares amplitude measurements on a single bearing with (dotted) and without (solid) the present invention in use.
Figure 15:
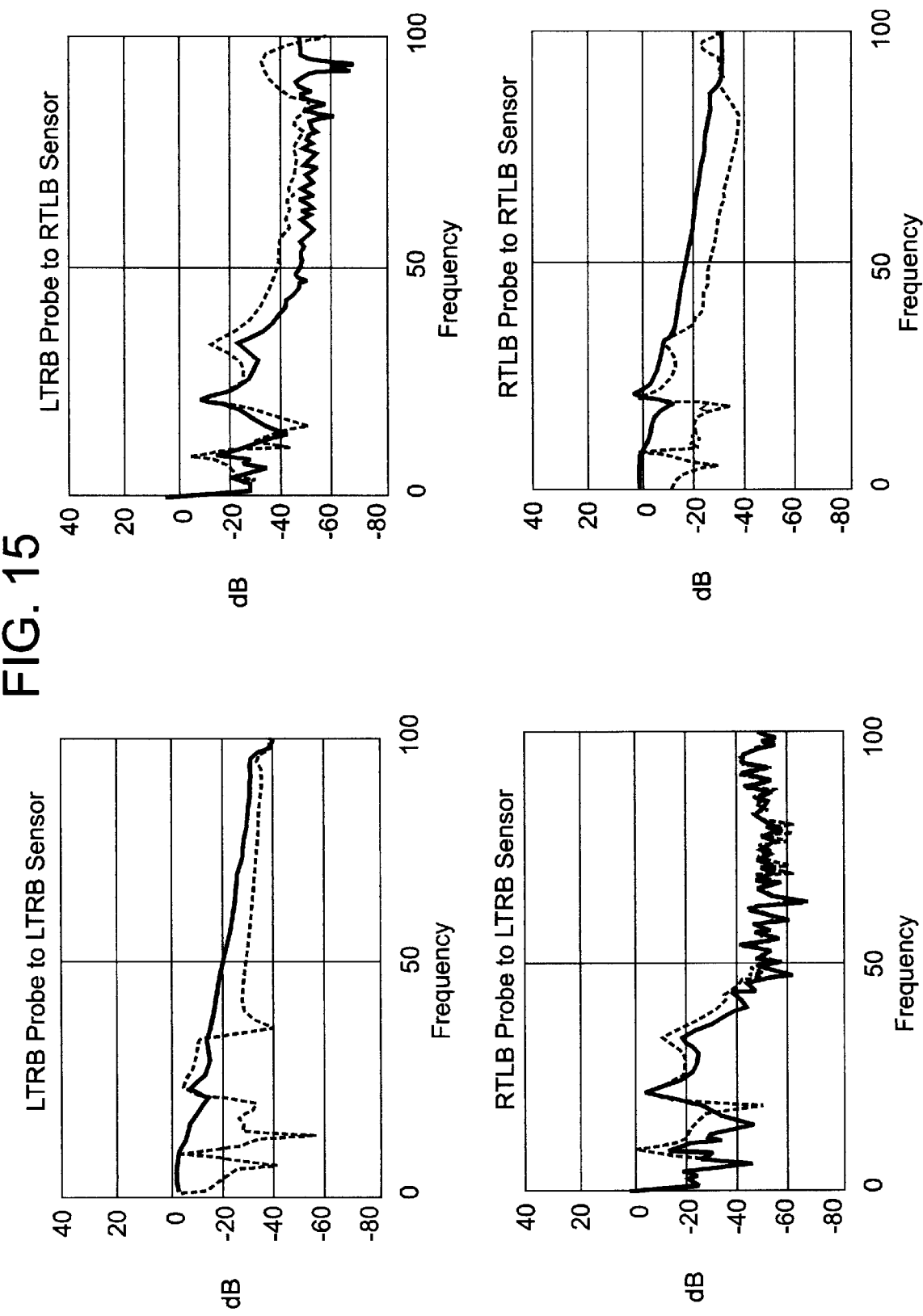
FIG. 15 compares amplitude measurements between two bearings with (dotted) and without (solid) the present invention in use.

FIG. 14 shows data collected on a two-radial bearing system. The solid traces are for an uncompensated plant, whereas the dotted traces are for a compensated plant. Only the amplitudes of the transfer functions on one bearing are shown. The compensator G removes the flexible modes (the resonances at 135 Hz and 335 Hz) from the plant allowing one to achieve higher gains on the PID controller. FIG. 15 shows the cross coupling between two radial bearings. The actuators are on one bearing and the sensors on the other. Again, the solid traces are for an uncompensated plant, whereas the dotted traces are for a compensated plant. In the diagonal plots, the actuator and the sensor are in the same direction, the off diagonal are for actuators and sensors in orthogonal directions. Notice that the technique discussed herein affects rigid body modes, as well as flexible modes. With compensation, the rigid-body coupling between bearings in the same direction is brought down to the level of the coupling between orthogonal directions. In FIG. 15, the compensation decreases the modal coupling between bearings as much as 20 dB out to about 25 Hz. The resulting plant is essentially diagonal at low frequency, and so can be handled by independent PID's in each actuation direction.

The Compensator

Figure 16:
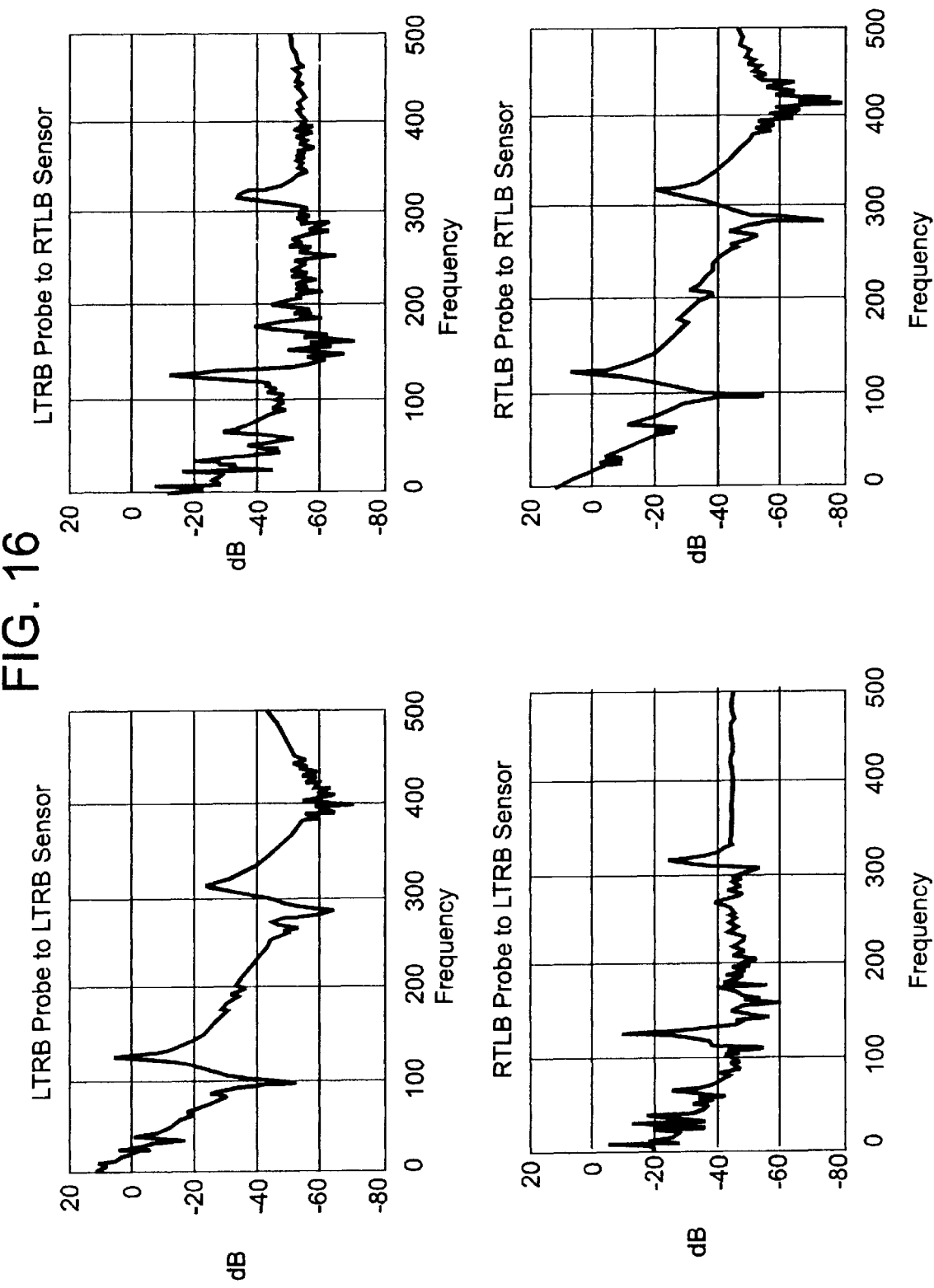
FIG. 16 illustrates low amplitude measurements between perpendicular directions on a single bearing without the present invention.

Immediately above we defined G to be the filter fit to the inverse of the plant $\hat{P}$, which was the open loop plant P with the negative stiffness piece D removed. For the case of a two-radial bearing system, coupling between orthogonal directions was small, as shown in FIG. 16 for a single bearing. In FIG. 16, the off-diagonal plots, which are the cross-terms, tend to be small compared to the diagonal terms. The cross terms between directions appear smaller here than in preceding illustrations because these measurements were made on a bearing which was closer to being truly orthogonal. Taking into account cross terms that are essentially just noise introduces errors into the calculation of the plant inverse and into the filter fit. In order to avoid the errors, we allow for the option of zeroing out matrix elements in the plant $\hat{P}$ before inversion. Three types of fits are allowed: fully coupled, quasidiagonal, and diagonal. The fully coupled case is a true inverse of the data as collected. The quasidiagonal case zeros out coupling between orthogonal directions, but allows coupling between the same directions on two different radial bearings. The diagonal case allows coupling only between colocated actuators and errors. The diagonal case most closely resembles a notch filter approach. It automates the process of putting notch filters at the location of flexible modes.

Figure 17:
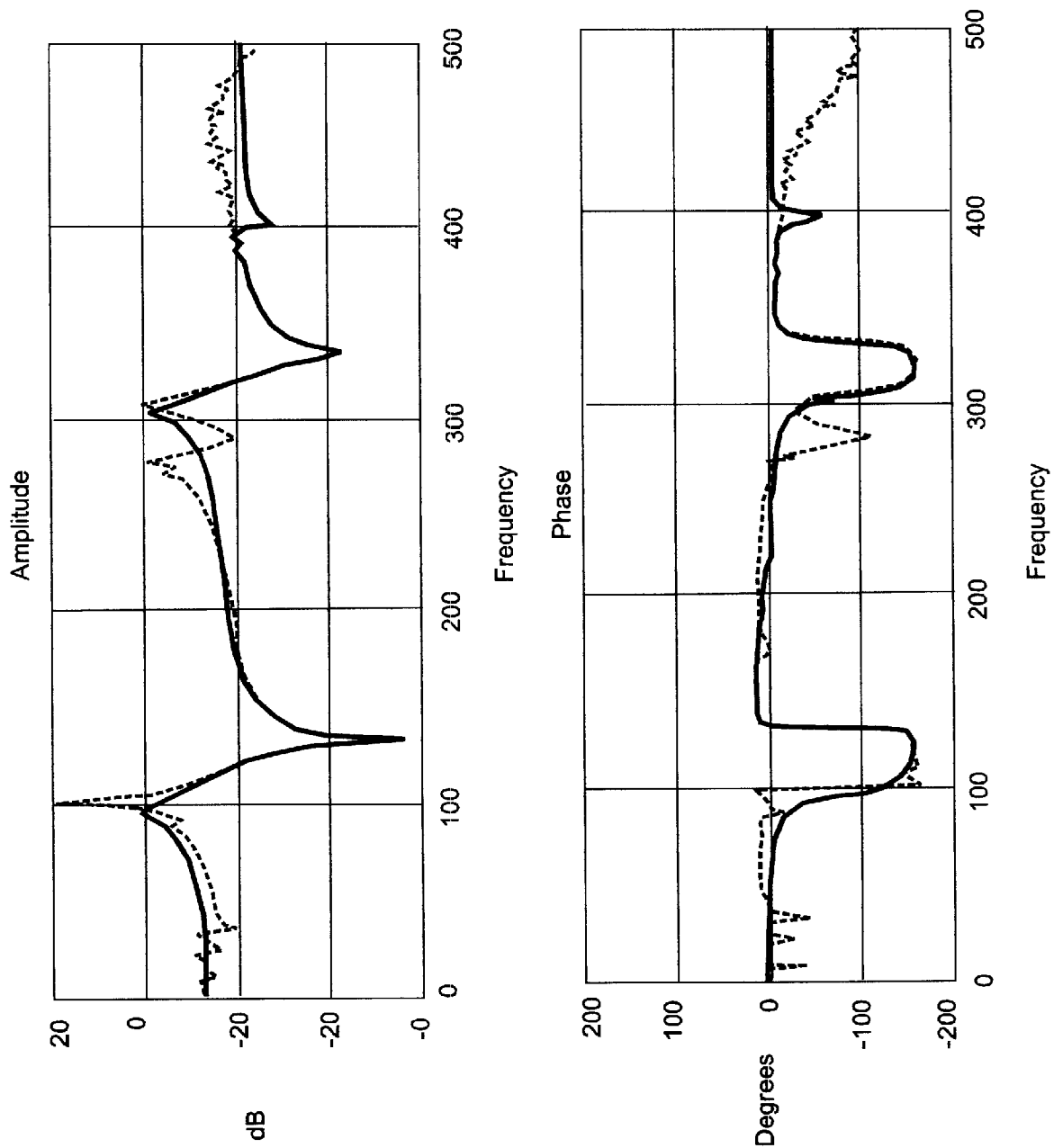
FIG. 17 shows graphs illustrating the filter fit for a control system according to the present invention.

Two compensators that can be used to implement the invention have been tested: a quasidiagonal and a diagonal one. FIG. 17 shows a typical filter fit for one matrix element in the diagonal case. The "smashing down" of the peaks in FIG. 17 is intentional in order to prevent gain from being added to the compensated transfer function at the location of the peaks. The peaks in the compensator are "undoing" nulls in the original transfer function. There is no penalty for decreasing gain at these frequencies and doing so makes the transfer function more robust to phase mismatches at those frequencies. A potential problem occurs at the location of the compensator nulls, which are designed to remove the peaks in the original plant transfer function. For best performance, these nulls are fit as accurately as possible, as was done in FIG. 17. Typically, however, there is a choice between robustness and performance. If the location of the peaks change, the compensator must be recalculated. Fitting less accurately and with a wider bandwidth at the location of the compensator nulls can make the compensator less sensitive to plant changes. However, the gain improvement over the uncompensated case will be less. This technique is superior to that of putting in notch filters at these frequencies. When notch filters are used, there is no attempt to adjust the phase roll, as is done here.

Resonance Controller

The resonance controller used with the invention uses a technique described in U.S. Pat. No. 5,816,122, which is assigned to the assignee of the present invention, and which is incorporated herein by reference. In this resonance control technique, a recursive adaptive filter is applied within an additional feedback path around the compensation and PID control loop. As shown in FIG. 5, the resonance controller operates on each sensing signal concurrently with the compensation and PID loop.

The resonance controller matrix $F_{res}$ is nominally a diagonal structure if the compensation filters produce a reasonably orthogonalized closed loop plant. If the closed loop plant remains highly coupled due to poor orthogonalization in the resonance frequency regions, $F_{res}$ may take a non-diagonal form, thereby increasing the computational load caused by the additional filters in $F_{res}$. For the case where $F_{res}$ can be considered diagonal, each resonance control filter will be associated with a unique magnetic bearing control direction. For example, one bearing in the left-top (LT) to right-bottom (RB) direction would be controlled by the $F_{11}$ filter in the $F_{res}$ matrix (see FIG. 6). Similarly, the $F_{22}$ filter would be associated with the RT to LB direction. Each resonance control filter is implemented as a finite-impulse-response (FIR) filter. The length (number of taps) in each filter is determined from the DSP sampling rate and the frequency of the lowest resonance to be controlled. The coefficients associated with each filter tap are computed adaptively according a filtered-x least mean square (FXLMS) adaptive filter algorithm. This calculation is performed after the necessary closed loop transfer functions are measured with just the compensation filters and PID controller operating. Once the resonance control filters are available, they can be activated as an outer loop controller providing attenuation of the desired modes in the levitated magnetic bearing system.

Narrowband Controller

For the magnetic bearing system described, several well-known techniques for synchronous vibration suppression can be incorporated to reduce vibrational energy associated with synchronous load disturbances and shaft imbalances. FIG. 5 depicts the topology where $G_{NB}$ is nominally a diagonal matrix of narrow band control signals. Typical forms for the narrow band controller shown in FIG. 5 are the narrow-band FXLMS and a narrow-band fixed-magnitude feedback controller with tracking. In both cases, inputs to the narrow-band controllers are the sensing signals and a tachometer signal from which the load disturbance frequency (frequencies) are computed. The output of each narrow band controller in the $G_{NB}$ matrix of FIG. 5 contains either a single frequency and/or harmonics of the fundamental synchronous vibration frequency requiring attenuation. The output signals are simply added to the drive signal at the output of the PID controllers. Alternatively, a tracking notch filter can be used to remove the disturbance frequencies and their harmonics before processing by the resonance controller and the PID controller with compensation. Design of the coefficients in the narrow band controllers (FXLMS and fixed-magnitude feedback with tracking) requires knowledge of the system dynamics (plant transfer functions) for the synchronous frequencies to be controlled. Design methods for determination of the coefficients are well-known in the magnetic bearing art, and are typically performed off-line once the necessary system dynamic data is available. Once the coefficients are available, the narrow band controllers or, alternatively, tracking notch filters would be activated after the shaft is levitated.

Hardware Implementation

A basic control system can work adequately for some applications without resonance or narrowband controllers. For clarity, such a system is illustrated in the block diagram in FIG. 18. This system includes a compensation filter and PID controllers according to the invention. The system was implemented using two DSP's, one for handling the input/output (I/O) functions, and another for running the application. Such a system can be built using a DS1004 combo hardware platform, available from dSPACE Incorporated, 22260 Haggerty Road—Suite 120, Northville, Mich. This hardware platform includes a five channel, 16 bit analog-to-digital converter and a six channel, 16 bit, digital-to-analog converter. The application processor is a DEC Alpha AXP 21164 with a 500 MHz clock speed. It should be noted that this particular hardware platform is shown as an example only. The inventive concepts discussed herein are independent of the specific hardware platform used to implement them.

Figure 18:
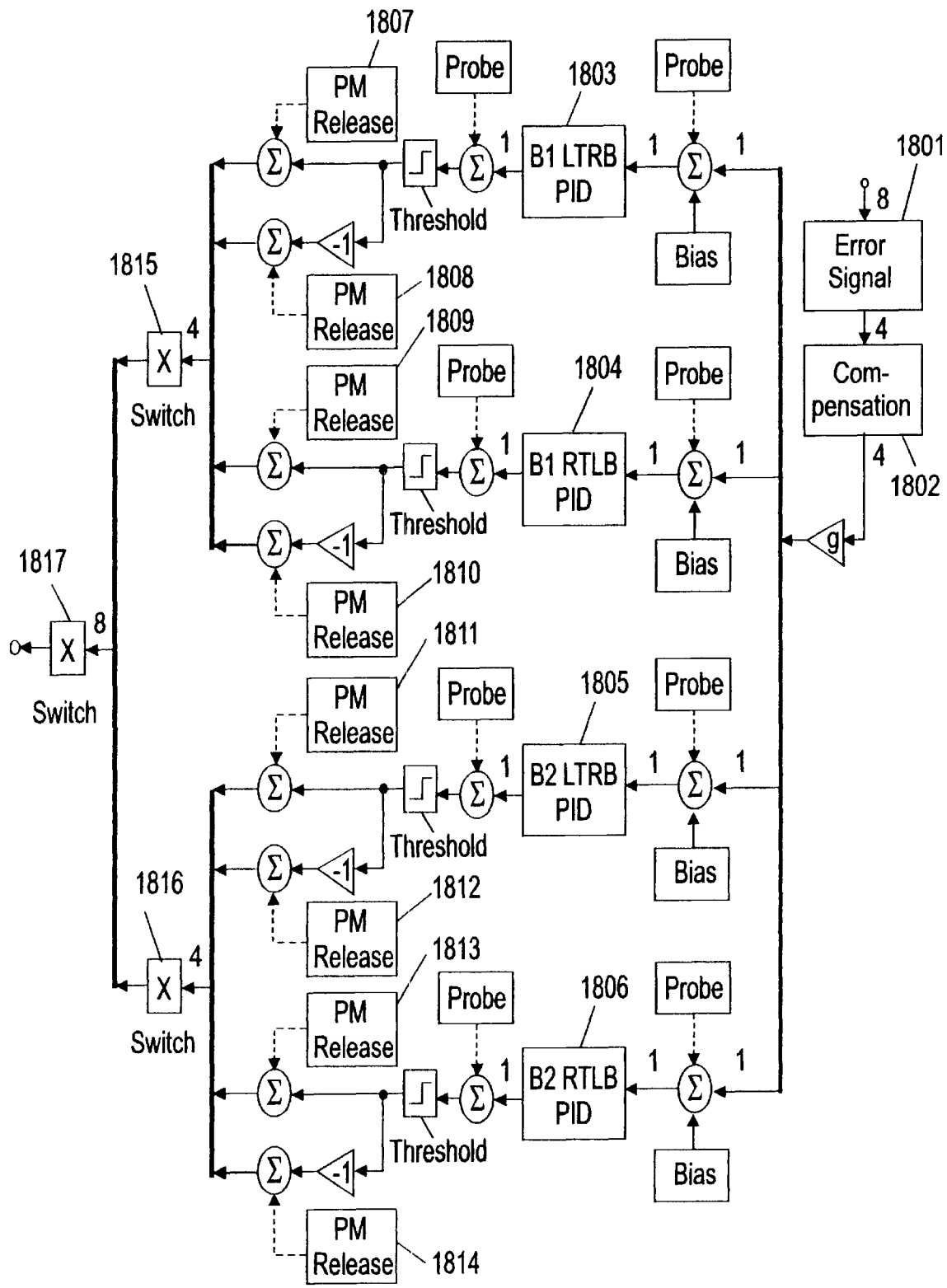
FIG. 18 is a hardware block diagram illustrating the hardware platform of a control unit according to the present invention.
Figure 19:
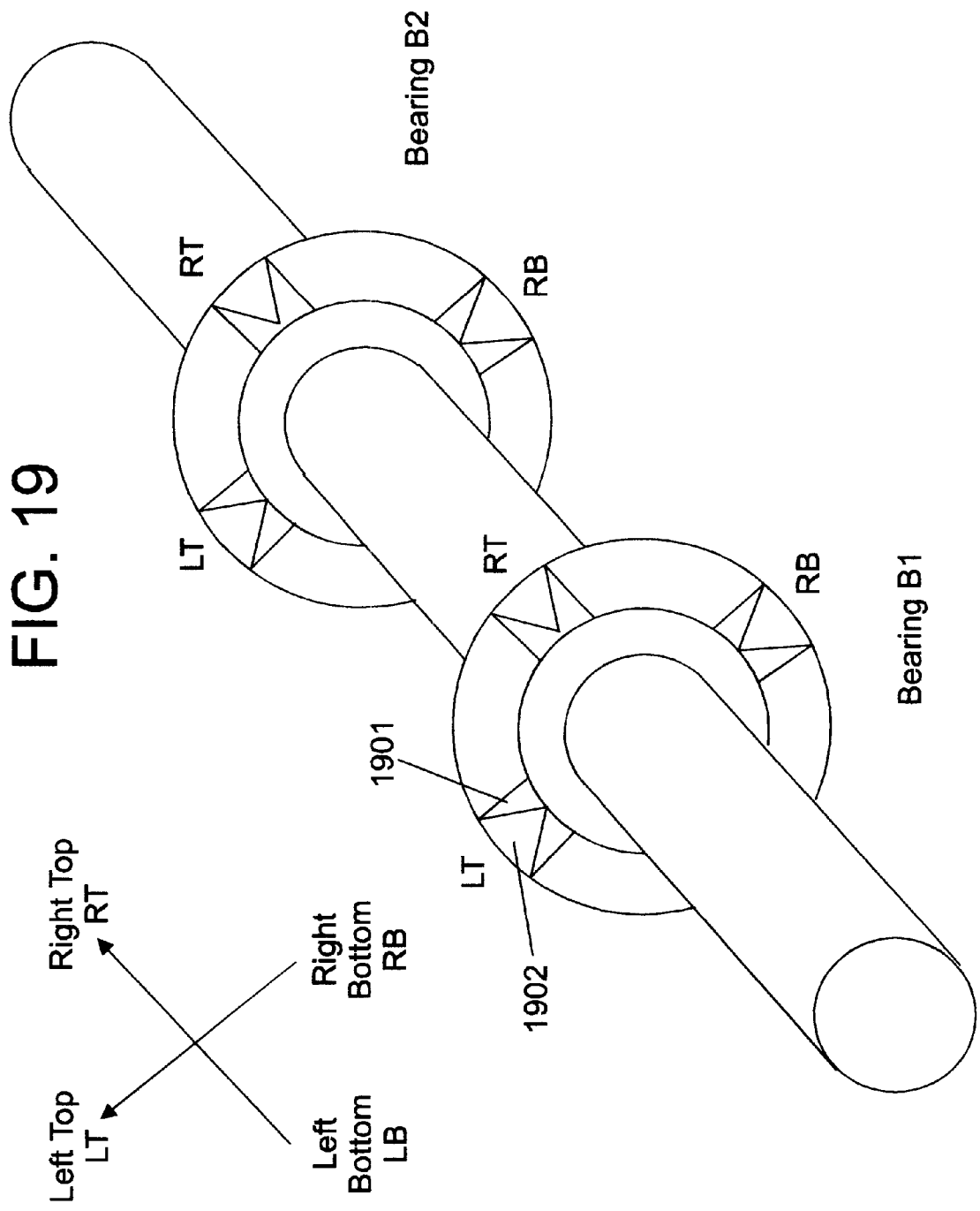
FIG. 19 illustrates a magnetic bearing and rotor arrangement that is being controlled by the invention implemented on the hardware platform shown in FIG. 18.

FIG. 18 shows a block diagram of the hardware configuration. The dimension of the system is four-by-four. Four error signals are converted to four output control signals. FIG. 19 shows how the four signals map to a physical bearing system with two radial bearings. Bearings B1 and B2 in FIG. 19 each contain four electromagnets (actuators), 1901 and four proximity probe sensors, 1902. The error signals shown in FIG. 18 are generated by block 1801 through computing the difference between opposing proximity probe sensors. This process converts the eight proximity probe inputs into four error signals. Note that in FIG. 18, the number of signals in a given path is indicated by the single digit numbers above the various signal paths.

Signals in FIG. 18 move from right to left. Digital filters, which can be included for low-pass filtering of the error signals, are omitted for clarity. Compensation block 1802 provides the four-by-four matrix of filters, which implement the compensator according to the invention. The negative stiffness is removed from the compensation filter by offline processing as previously described. The compensation block, 1802, is implemented by the application DSP. After applying a gain, g, each resultant signal is fed to a PID controller which is implemented by the application DSP. Controllers 1803 and 1804 are for bearing B1 and controllers 1805 and 1806 are for bearing B2. Gain g adjusts the root-mean-square (RMS) level of the plant to what it was before the compensator was included so that the PID gains stay at approximately the same values. The control system produces eight output control signals, one for each actuator. Only four of these signals are independent; opposing actuators, as shown in FIG. 19, work in a push-pull configuration. Note that FIG. 19 shows the actuators and sensors to be colocated by way of example. The sensors can be located separately from the electromagnetic actuators.

Probe signals are shown in FIG. 18 by dotted lines, which are summed into the signal path before and after the PID controllers. This notation is meant to illustrate a choice of summing the probe signals EITHER before or after the PID controllers. The preferred location choice for extracting the open loop plant as previously described is before the PID controllers. Injecting a probe signal after the PID controllers allows for direct open loop plant measurements prior to levitation with the PID controllers turned off and with the shaft held in position mechanically. Although this open loop plant differs from the levitated open loop plant, it allows the operator to get an idea of the complexity of the open loop plant dynamics prior to levitation. A bias voltage can also be summed with the error signal prior to entering a PID controller. These bias voltages, referred to as set point voltages in FIG. 5 and FIG. 6, can be used to correct offsets in the A/D's or to float the shaft off center. DC voltage offsets added to the control signal can be used to help lift the rotor or to release the rotor when it becomes attached to the permanent magnets. In a test configuration, proportional and integral gains were enough to levitate the shaft without additional voltage offsets. However, the PM (permanent magnet) release feature shown in FIG. 18 was frequently used during initial levitation testing before the PID parameters were determined. A DC voltage was applied to the electromagnet actuators to oppose the permanent magnet field when the rotor hit the stator and was held in place by the permanent magnets. Failsafe logic can optionally be added to the system shown in FIG. 18 to drop the rotor if the distance from center exceeds some user specified radius, for example, ten mils. The failsafe logic is enabled after levitation and must be disabled in order to levitate. It is designed to automatically shut down the control system should the controller begin to go unstable. The intention is that with the control signal off, the rotor will fall due to gravity before it has a chance to hit the stator, and possibly misalign or damage sensors there. On/off switch 1815 is included to shut off bearing B1, and on/off switch 1816 shuts of bearing B2. Switch 1817 serves as a master switch to shut off the entire control system. These switches can be mechanical or electronic. Also note that the control signal has a threshold applied after each PID controller to avoid damaging the bearing actuators.

Figure 20:
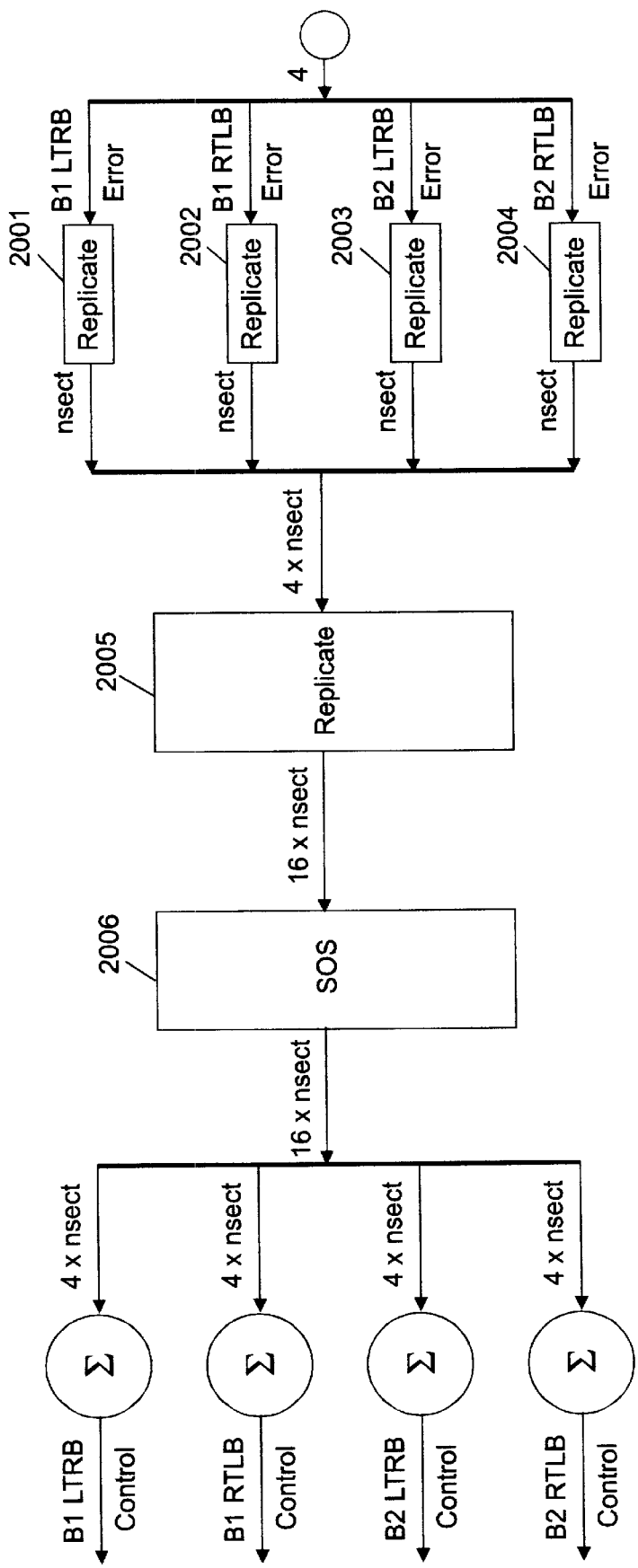
FIG. 20 block diagram of the compensation filter for the implementation of the invent shown in FIG. 18.

Each filter within the compensator is a sum of second order sections. The number of second order sections required for a compensator with this hardware implementation is 4×4×nsect, where nsect is the number of sections in a single filter (for this example, nine) and four-by-four is the number of filters required from four error inputs to four control outputs. FIG. 20 shows how the error time series are processed to obtain the time series for each of 4×4×nsect sections. The four error sensor time series are replicated nsect times for simultaneous processing by the biquad sections of a single filter. In addition, the 4×nsect time series are replicated an additional four times for simultaneous multiplication by each row of filters. SOS block 2006 represents an array of 4×4×nsect second order sections (SOS's). The summations on the output signals represent both the sum over sections to obtain the action of one filter on one error time series and the matrix multiplication of a row of filters by a column of error sensor time series. The summation is over 4×nsect terms. The output of each summation is a single time series. The control system is designed so that the compensator is downloaded initially as an identity matrix. Using an identity compensator, the rotor is levitated and a system identification is computed. A unifying compensator is constructed based on the system identification. The desired unifying compensators are then read in as dSPACE parameter files. The use of parameter files allows the compensator to be changed without recompiling.

Figure 21:
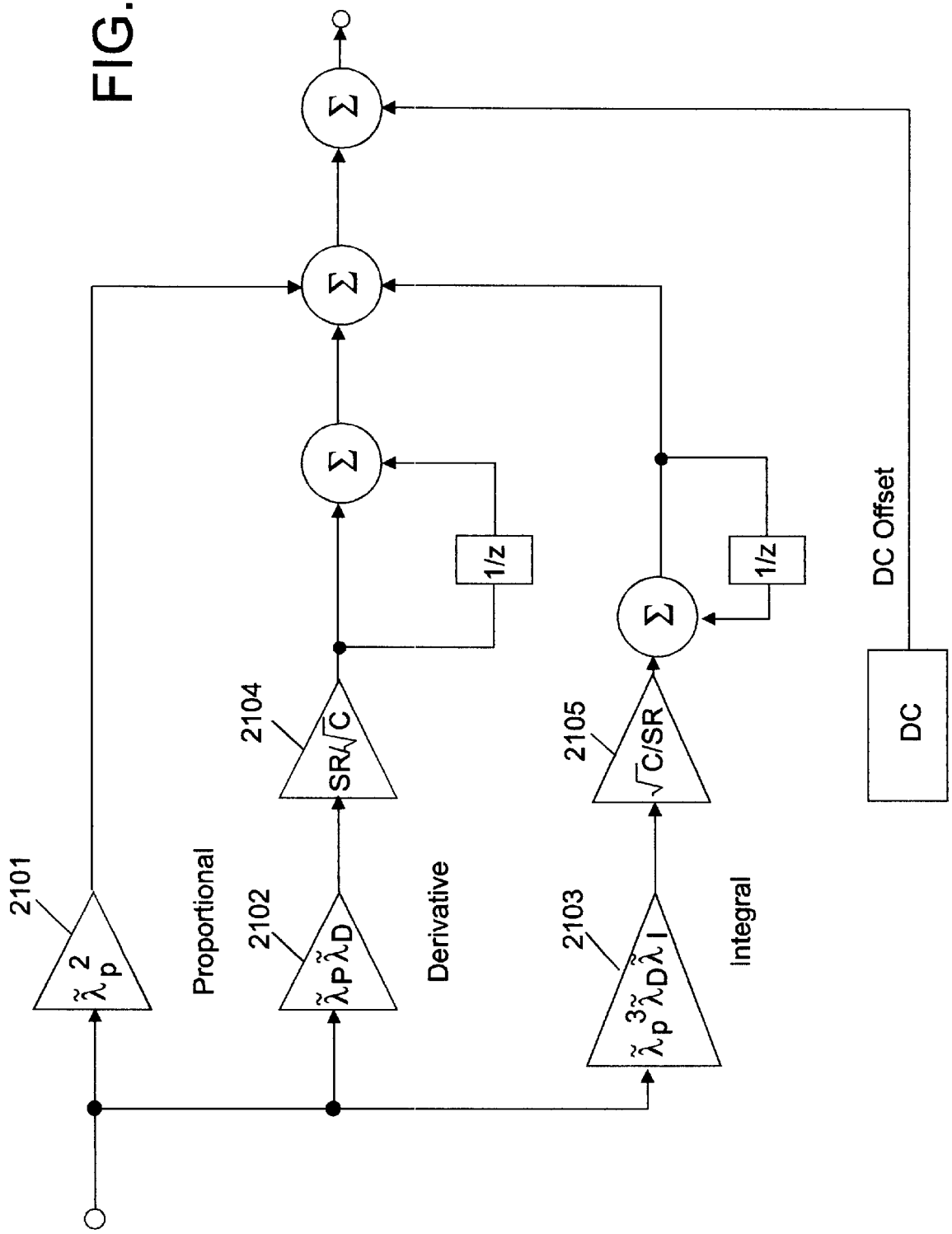
FIG. 21 is a block diagram illustrating a PID controller portion of the hardware shown in the diagram of FIG. 18.

FIG. 21 shows the PID controller. When the compensator is the identity matrix, the controller reduces to four independent PID controllers. The proportional, integral and derivative paths are identified in the diagram. In addition, a DC offset term is included to aid in levitating if this is necessary. Typically, this offset is set to zero since proportional and integral terms are sufficient to levitate the rotor. Not shown in the FIG. 21 is how windup is handled. Windup refers to memory in the integral path. Each new sample is added to the sum of the previous samples stored in memory. Under certain conditions, one may want to restart the integration from zero. In this implementation, the controller is designed to restart: (1) when the integral gain is set to zero on a single PID, (2) when a single PID is turned off and then on, and (3) when a reset button is used to restart the integration on all the PID's simultaneously. The input parameters are shown as gain elements 2101, 2102, and 2103. The gain elements 2104 and 2105 are used to scale the input parameters. The parameter values shown in FIG. 21 were used for testing as discussed below, and are shown by way of example only.

Testing

Testing showed considerable improvement in PID gains over that of prior-art control systems. In particular, the proportional gain increased by a factor of four. Before describing the improvement in the other gains, it is useful to describe the scaling used for the input parameters. Previously we labeled the PID gains as $(\lambda_P, \lambda_I, \lambda_D)$. In the test DSP implementation the set of input parameters were $(\tilde{\lambda}_P, \tilde{\lambda}_I, \tilde{\lambda}_D)$, where:

$$\lambda_P = \tilde{\lambda}_P^2$$

$$\lambda_D = \frac{SR}{\sqrt{C}} \tilde{\lambda}_P \tilde{\lambda}_D$$

$$\lambda_I = \frac{\sqrt{C}}{SR} \tilde{\lambda}_P^3 \tilde{\lambda}_D \tilde{\lambda}_I.$$

The above scaling is designed so that the tilde parameters are dimensionless and, in particular, are independent of sampling rate SR. C is a physical constant that has the dimensions of Hz$^2$ per volt. It can be expressed as C=C'/M where C' is the conversion of voltages to #/in and M is in slugs #/g where g is acceleration due to gravity. All of the control voltages are multiplied by C. Integrating twice to obtain a displacement from the control forces results in an additional factor of 1/SR$^2$. This scaling has a straightforward physical interpretation. If the negative stiffness were zero (or small compared to the proportional gain) and the open loop transfer function $\hat{P}$ is the same as that of a wire, then the displacement would have an oscillation frequency $\omega_0 = \sqrt{C\lambda_P}$. Defining $\tilde{\omega}_0 = \omega_0/SR$, the PID gains scale according to $$\frac{C}{SR^2} \lambda_P = \tilde{\omega}_0^2$$

$$\frac{C}{SR^2} \lambda_D = \tilde{\omega}_0 \tilde{\lambda}_D$$

$$\frac{C}{SR^2} \lambda_I = \tilde{\omega}_0^3 \tilde{\lambda}_D \tilde{\lambda}_I.$$

The frequency is factored out of the derivative gain in order for its effective damping to be independent of frequency. The definition of the integral gain in terms of $\omega_0$ is consistent with the proportional and derivative gains. Each integral results in a factor of $\omega_0$. The integral gain is also proportional to the scaled derivative gain in order to help maintain stability. In addition to providing infinite DC stiffness, the integral gain opposes the effect of the damping due to derivative gain. If the derivative gain is decreased the integral gain should be decreased proportionally to maintain the same effective damping. With compensation, the scaled derivative gain can be increased by a factor of three and the unscaled gain by a factor of six. The scaled integral gain was unchanged and the unscaled integral gain increased by a factor of 24.

Figure 22:
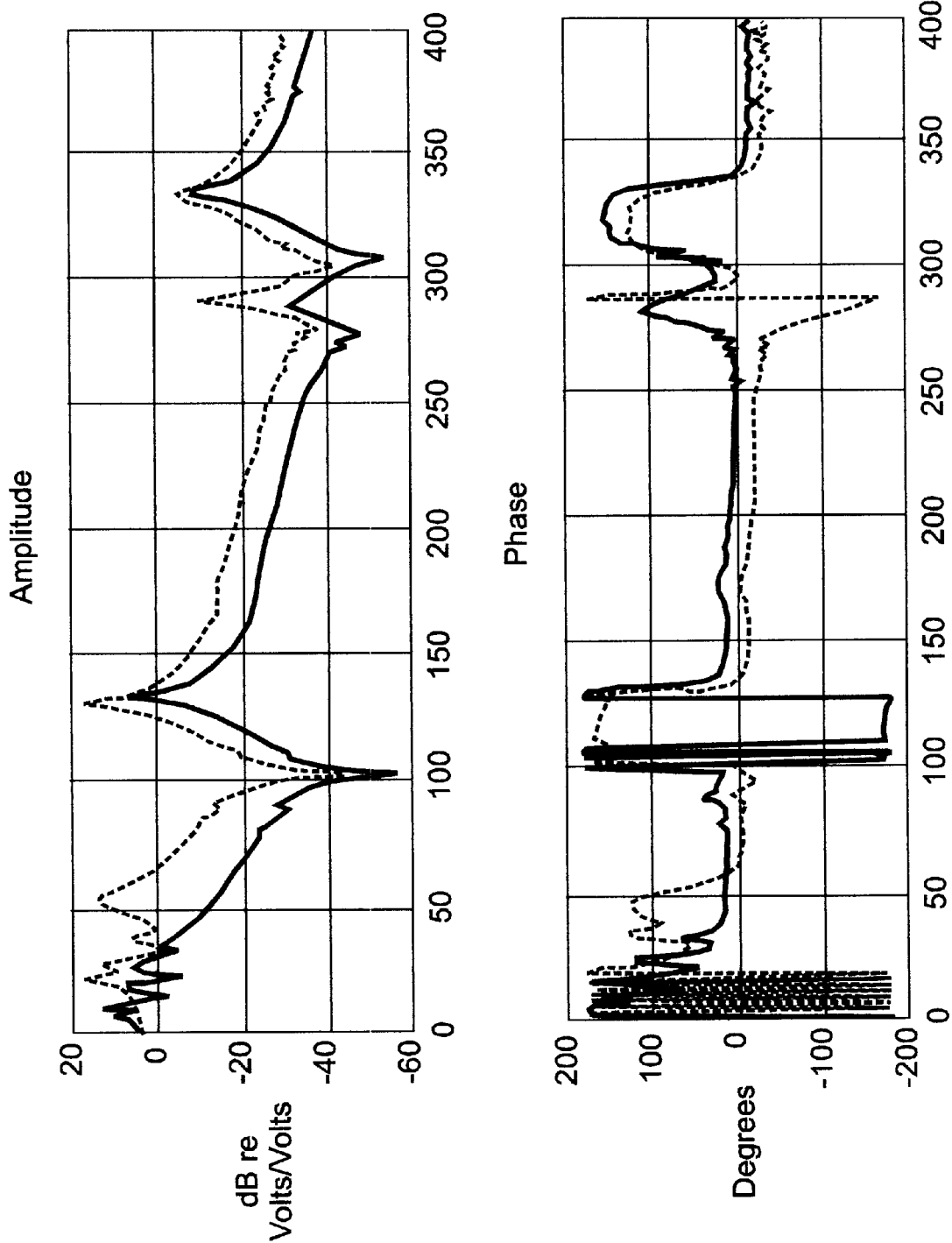
FIG. 22 shows graphs illustrating higher gains achieved through the use of the invention in a magnetic bearing system.
Figure 23:
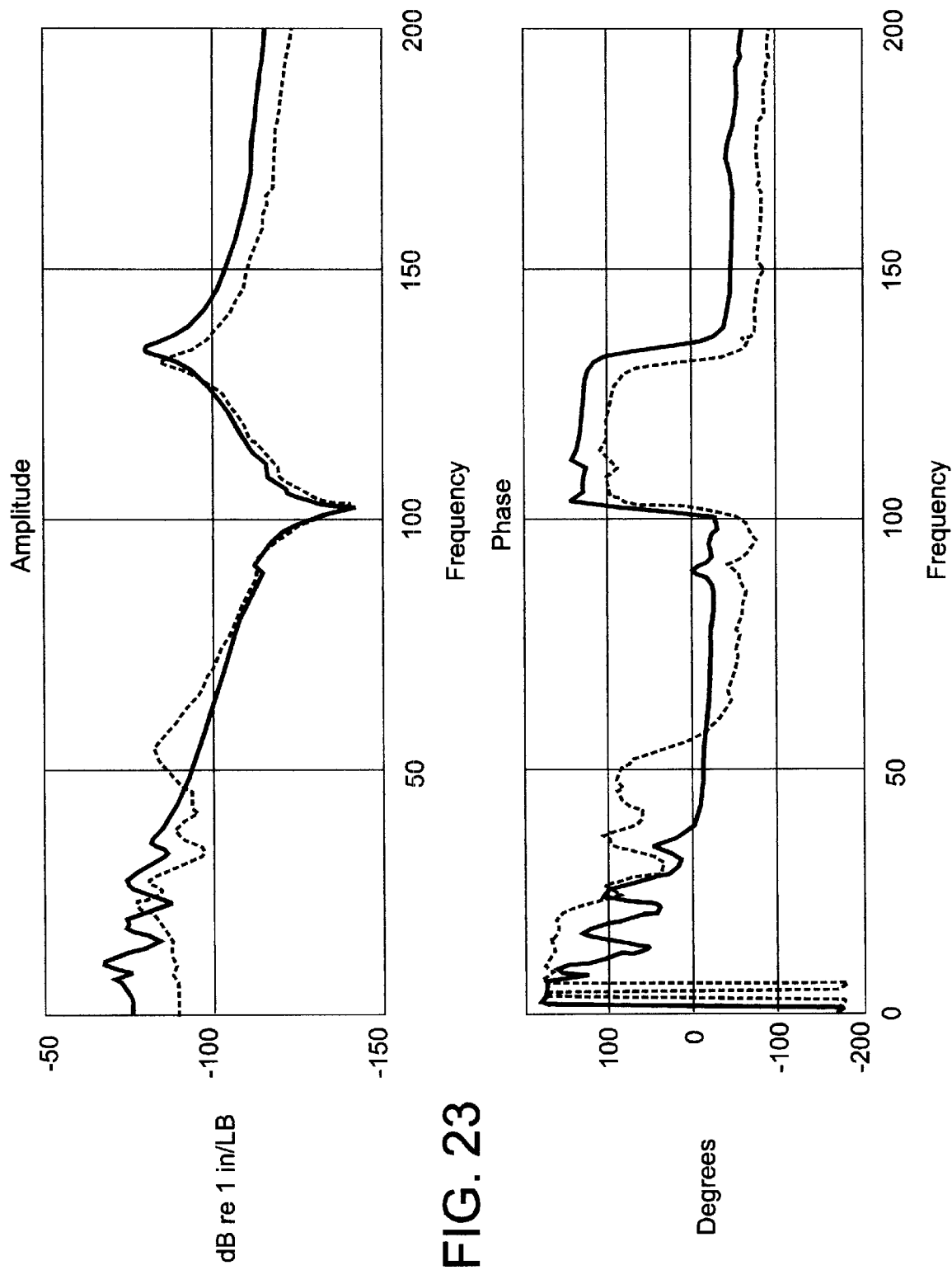
FIG. 23 shows graphs illustrating better disturbance rejection achieved through the use of the invention in a magnetic bearing system.

FIG. 22 shows the effect of compensation on the closed loop transfer function. The transfer function is measured from the input to the PID controllers to the error sensors, as shown in FIG. 11. The compensated transfer function in FIG. 22 is shown as a dotted trace and the uncompensated as solid. The increase in gain achieved by the compensator pushes the resonant frequencies of the rigid body modes up to higher values, while the frequency of the flexible modes at 135 Hz and 335 Hz remains the same. Neither uncompensated [$\lambda_P$=0.8, $\tilde{\lambda}_I$0.0017, $\tilde{\lambda}_D$=0.3] nor compensated [$\lambda_P$=1.7, $\tilde{\lambda}_I$=0.0017, $\tilde{\lambda}_D$=0.9] normalized PID gains are at their maximum levels. These levels are comfortably stable, rather than borderline stable in both cases. The approximate stability limits on the proportional gain are about 1.0 uncompensated and 1.9 compensated for the particular compensator used in FIG. 22. FIG. 23 shows the effect of compensation on disturbance rejection. Referring again to FIG. 11, the disturbance rejection is the transfer function from the disturbance to the error. It measures how much an applied disturbance will be attenuated by the action of the control unit. In this case the disturbance rejection is calculated from the same data set as used to calculate the transfer function for FIG. 22. The disturbance rejection is the transfer function shown in FIG. 22 divided by the controller transfer function. FIG. 23 shows a 15 dB improvement in disturbance rejection at low frequency (<20 Hz) due to the higher gain associated with the compensator. The disturbance rejection plot for the compensated transfer function is dotted and for the uncompensated transfer function is solid. The slight shift in the location of the flexible modes (135 Hz and 335 Hz) is due to a change in the plant transfer function between the two measurements. The dynamic stiffness function, which is the restoring force in pounds per inch, is roughly the inverse of the transfer function amplitude in FIG. 23. Although this technique is capable of significantly improving the dynamic stiffness of the magnetic bearing at low frequency, the technique is unlikely to affect the acoustic noise associated with the higher frequency flexible modes at 135 Hz and 335 Hz. These high-Q flexible modes can be treated with resonance control.

We have described specific embodiments of our invention, which provides an improved control system for electromechanical devices. One of ordinary skill in the magnetic, control and electronics arts will quickly recognize that the invention has numerous other embodiments. In fact, many implementations are possible. The following claims are in no way intended to limit the scope of the invention to the specific embodiments described.

We claim:

1. A system for suspending a movable member, the system comprising:

at least one magnetic bearing operable to suspend the movable member in response to a control signal;

at least one sensor disposed to detect displacement of the movable member from a desired position, the sensor providing a sensing signal; and a control system connected to the magnetic bearing and the sensor, the control system including a control unit for processing the sensing signal and producing at least a portion of the control signal so that the magnetic bearing responds to the control signal to maintain the movable member in the desired position, the control unit further including a unifying plant compensation filter which isolates a negative stiffness characteristic, wherein the control unit further comprises:

a resonance controller connected between the sensor and the compensation filter for adaptively filtering a negated sensing signal;

a PID controller connected to the compensation filter, the PID controller operable to produce a PID controller output signal;

a narrowband controller operating on the sensing signal, and connected to a tachometer signal input, the narrowband controller removing at least in part noise caused by imbalances and loading of the movable member, the narrowband controller operable to produce a narrowband controller output signal; and a summer connected to the PID controller and the narrowband controller, so as to be operable to produce at least a portion of the control signal from the narrowband controller output signal and the PID controller output signal.

* * * * *